United States Patent
Culmer et al.

(10) Patent No.: US 10,352,025 B2
(45) Date of Patent: Jul. 16, 2019

(54) PLUMBING FIXTURE FITTING WITH MOUNTING SYSTEM

(71) Applicant: Moen Incorporated, North Olmsted, OH (US)

(72) Inventors: Jeremy S. Culmer, Parma, OH (US); Ryan M. Snitil, Medina, OH (US)

(73) Assignee: Moen Incorporated, North Olmsted, OH (US)

( * ) Notice: Subject to any disclaimer, the term of this patent is extended or adjusted under 35 U.S.C. 154(b) by 71 days.

(21) Appl. No.: 15/582,600

(22) Filed: Apr. 28, 2017

(65) Prior Publication Data

US 2017/0314240 A1  Nov. 2, 2017

Related U.S. Application Data

(60) Provisional application No. 62/329,748, filed on Apr. 29, 2016.

(51) Int. Cl.
| | |
|---|---|
| *E03C 1/042* | (2006.01) |
| *E03C 1/04* | (2006.01) |
| *B05B 1/16* | (2006.01) |
| *B05B 1/18* | (2006.01) |
| *F16K 11/085* | (2006.01) |
| *F16K 31/60* | (2006.01) |
| *E03C 1/02* | (2006.01) |
| *E03C 1/06* | (2006.01) |

(52) U.S. Cl.
CPC ............ *E03C 1/042* (2013.01); *B05B 1/1636* (2013.01); *B05B 1/18* (2013.01); *E03C 1/023* (2013.01); *E03C 1/0408* (2013.01); *E03C 1/0409* (2013.01); *E03C 1/066* (2013.01); *F16K 11/085* (2013.01); *F16K 11/0853* (2013.01); *F16K 31/602* (2013.01); *Y10T 137/698* (2015.04); *Y10T 137/6977* (2015.04)

(58) Field of Classification Search
CPC .................. E03C 1/0408; E03C 1/042; E03C 2001/0406; Y10T 137/6977; Y10T 137/698

See application file for complete search history.

(56) References Cited

U.S. PATENT DOCUMENTS

| | | |
|---|---|---|
| 999,332 A | 8/1911 | Mueller |
| 1,758,115 A | 5/1930 | Kelly |
| 1,799,815 A | 4/1931 | Hoff |
| 2,228,626 A | 1/1941 | Hetherington |
| 2,759,765 A | 8/1956 | Pawley |

(Continued)

FOREIGN PATENT DOCUMENTS

| | | |
|---|---|---|
| CA | 2337671 A1 | 1/2002 |
| CN | 201248644 Y | 6/2009 |

(Continued)

OTHER PUBLICATIONS

Author unknown, Bristan Angled Hose Connector Technical Data Sheet, the product shown in the Technical Data Sheet is believed to have been publicly available in 2005 (1 page).

(Continued)

*Primary Examiner* — Kevin F Murphy
(74) *Attorney, Agent, or Firm* — Calfee, Halter & Griswold LLP

(57) ABSTRACT

The present invention provides a plumbing fixture fitting with a mounting system.

20 Claims, 25 Drawing Sheets

(56) References Cited

U.S. PATENT DOCUMENTS

| | | |
|---|---|---|
| 2,846,691 A | 8/1958 | Zettinig |
| 3,136,570 A | 6/1964 | Lee |
| 3,188,120 A | 6/1965 | Peterson |
| 3,913,839 A | 10/1975 | Wilson |
| 3,943,961 A * | 3/1976 | Knapp .................. E03C 1/0404 137/269 |
| 4,457,342 A | 7/1984 | Moen |
| 5,305,916 A | 4/1994 | Suzuki et al. |
| 5,329,650 A | 7/1994 | Zaccai et al. |
| 5,829,469 A | 11/1998 | Sileno, Jr. et al. |
| 5,870,781 A | 2/1999 | Williams |
| 6,038,715 A | 3/2000 | Flieger et al. |
| 6,175,972 B1 | 1/2001 | Wales |
| 6,192,529 B1 | 2/2001 | Jones et al. |
| 6,264,121 B1 | 7/2001 | McClary |
| 6,276,004 B1 | 8/2001 | Bertrand et al. |
| 6,301,727 B1 | 10/2001 | Bertrand et al. |
| 6,378,912 B1 * | 4/2002 | Condon .................... F16L 5/06 239/273 |
| 6,419,276 B1 * | 7/2002 | Gatter .................... E03C 1/042 137/359 |
| 6,438,767 B1 | 8/2002 | Warshawsky |
| 6,464,265 B1 | 10/2002 | Mikol |
| 6,643,862 B2 | 11/2003 | Aitken |
| 6,668,393 B1 | 12/2003 | Macari et al. |
| 6,840,267 B1 * | 1/2005 | Jennings .................. E03C 1/042 137/360 |
| 6,874,527 B2 * | 4/2005 | Meeder .................. E03C 1/0401 137/359 |
| 7,043,776 B1 | 5/2006 | Wu |
| 7,077,150 B2 * | 7/2006 | McNerney ............... E03C 1/042 137/15.01 |
| 7,111,875 B2 * | 9/2006 | Ball ........................ E03C 1/042 137/360 |
| 7,273,070 B2 | 9/2007 | Lin |
| D559,949 S | 1/2008 | Bickler et al. |
| 7,406,984 B2 * | 8/2008 | Nikles ..................... E03C 1/023 137/625.5 |
| 7,458,112 B1 | 12/2008 | Yang |
| 7,614,424 B2 | 11/2009 | Gloor |
| 7,748,649 B2 | 7/2010 | Fujii et al. |
| 7,793,365 B2 * | 9/2010 | Miura .................... E03C 1/0403 137/360 |
| 7,987,533 B2 | 8/2011 | Phipps et al. |
| 8,056,574 B2 | 11/2011 | Erickson et al. |
| 8,070,076 B2 | 12/2011 | Erickson et al. |
| 8,082,610 B2 | 12/2011 | Henry et al. |
| 8,104,111 B2 | 1/2012 | Gross et al. |
| 8,122,528 B2 | 2/2012 | Heisterhagen |
| 8,156,579 B2 | 4/2012 | Renfrew |
| 8,225,434 B2 | 7/2012 | Grohe |
| 8,230,882 B2 | 7/2012 | Lacher |
| 8,429,769 B2 | 4/2013 | Gross |
| 8,621,681 B2 | 1/2014 | Macan et al. |
| 8,683,624 B1 | 4/2014 | Zhadanov et al. |
| 8,684,039 B2 | 4/2014 | Cai |
| 8,851,116 B1 | 10/2014 | Zhadanov et al. |
| 8,939,175 B2 | 1/2015 | Lea et al. |
| 9,145,665 B2 | 9/2015 | Bors et al. |
| 9,273,452 B2 | 3/2016 | Wilson |
| 9,410,309 B2 | 8/2016 | Sharratt et al. |
| 9,506,230 B2 | 11/2016 | Schulte |
| 9,677,256 B2 | 6/2017 | Wilson |
| 9,700,909 B2 | 7/2017 | Leber et al. |
| 9,702,127 B2 | 7/2017 | Lev |
| 10,024,038 B2 | 7/2018 | Wilson |
| 2002/0040500 A1 | 4/2002 | Noguchi et al. |
| 2004/0134924 A1 | 7/2004 | Hansen et al. |
| 2005/0063772 A1 | 3/2005 | Bladen |
| 2006/0021131 A1 | 2/2006 | Robert et al. |
| 2006/0150314 A1 | 7/2006 | Flieger et al. |
| 2006/0196972 A1 | 9/2006 | Kajuch |
| 2007/0199144 A1 | 8/2007 | Glunk et al. |
| 2008/0083844 A1 | 4/2008 | Leber et al. |
| 2010/0024909 A1 | 2/2010 | Lu et al. |
| 2010/0276020 A1 | 11/2010 | Fan et al. |
| 2017/0157634 A1 | 6/2017 | Johnson |
| 2018/0347160 A1 | 12/2018 | Wilson |

FOREIGN PATENT DOCUMENTS

| | | |
|---|---|---|
| CN | 201537035 U | 8/2010 |
| CN | 201588317 U | 9/2010 |
| CN | 201968563 U | 9/2011 |
| CN | 202151342 U | 2/2012 |
| DE | 2601059 B1 | 7/1977 |
| DE | 102005004788 A1 | 8/2006 |
| EP | 0308694 A1 | 3/1989 |
| EP | 0912127 B1 | 5/1999 |
| EP | 1405955 A2 | 4/2004 |
| FR | 2416308 A1 | 8/1979 |
| FR | 2606296 A1 | 5/1988 |
| FR | 2713301 A1 | 6/1995 |
| GB | 1046746 | 10/1966 |
| GB | 1401437 | 7/1975 |
| GB | 2073585 A | 10/1981 |
| GB | 2109226 A | 6/1983 |
| GB | 2433885 A | 7/2007 |
| GB | 2466504 A | 6/2010 |
| JP | H02112758 A | 4/1990 |
| WO | 1998002077 A1 | 1/1998 |
| WO | 2003066976 A1 | 8/2003 |
| WO | 2005031073 A1 | 4/2005 |
| WO | 2011153931 A1 | 12/2011 |
| WO | 2011153933 A1 | 12/2011 |

OTHER PUBLICATIONS

Author unknown, Bristan The Essential P&P Apr. 2005 Product Guide & Retail Price List Pages, the Product Guide & Retail Price List is believed to have been publicly available in Apr. 2005 (3 pages).

Author unknown, Grohe Aquatower 3000 Product Manual, the product shown in the Product Manual is believed to have been publicly available in 2007 (11 pages).

Author unknown, Grohe Retro-Fit Shower System Product Specification, the product shown in the Product Specification is believed to have been publicly available at least as early as Jun. 2015 (1 page).

Author unknown, Grohe 2007 Price List Pages, the Price List is believed to have been publicly available on Jan. 1, 2007 (3 pages).

Author unknown, Grohe 2008 Mid-Year Price List Pages, the Price List is believed to have been publicly available on Aug. 1, 2008 (2 pages).

Author unknown, Hansgrohe Raindance Connect Installation/User Instructions/Warranty, the Installation/User Instructions/Warranty is believed to have been publicly available in May 2014 (27 pages).

Author unknown, Hansgrohe Raindance Connect Parts List, the Parts List is believed to have been publicly available in Jul. 2011 (12 pages).

Author unknown, Hansgrohe Shower Panel Parts Diagram, the product shown in the Parts Diagram is believed to have been publicly available prior to Apr. 29, 2016 (1 page).

Author unknown, Kohler HydroRail-R Shower Column Product Specification, the product shown in the Product Specification is believed to have been publicly available prior to Apr. 29, 2016 (2 pages).

Author unknown, Kohler HydroRail-S Shower Column Product Specification, the product shown in the Product Specification is believed to have been publicly available prior to Apr. 29, 2016 (2 pages).

Author unknown, Newport Brass 2010 Catalog Pages, the Catalog is believed to have been publicly available in 2010 (7 pages).

Author unknown, Rohl Retro-Fit Shower Column Riser With Diverter Product Specification, the product shown in the Product Specification is believed to have been publicly available at least as early as Jun. 4, 2016 (1 page).

(56) References Cited

OTHER PUBLICATIONS

Author unknown, Rohl 2009 Price List Pages, the Price List is believed to have been publicly available on Jan. 1, 2009 (9 pages).

* cited by examiner

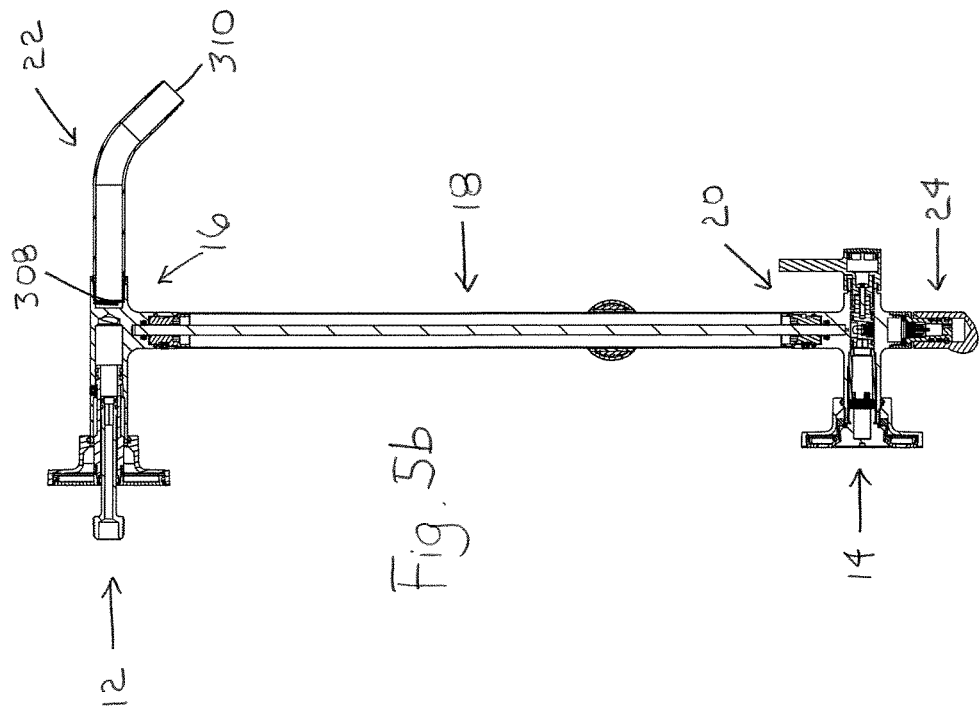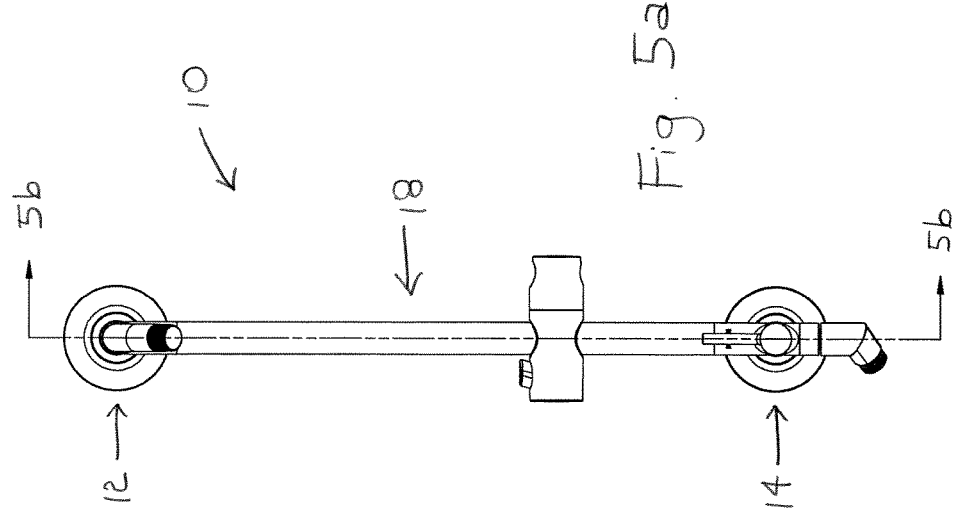

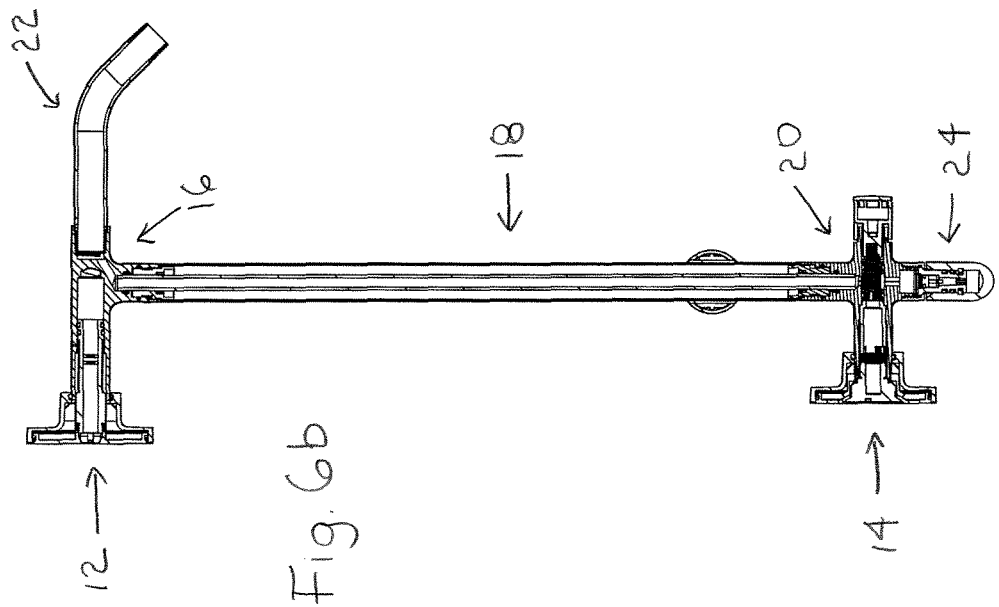
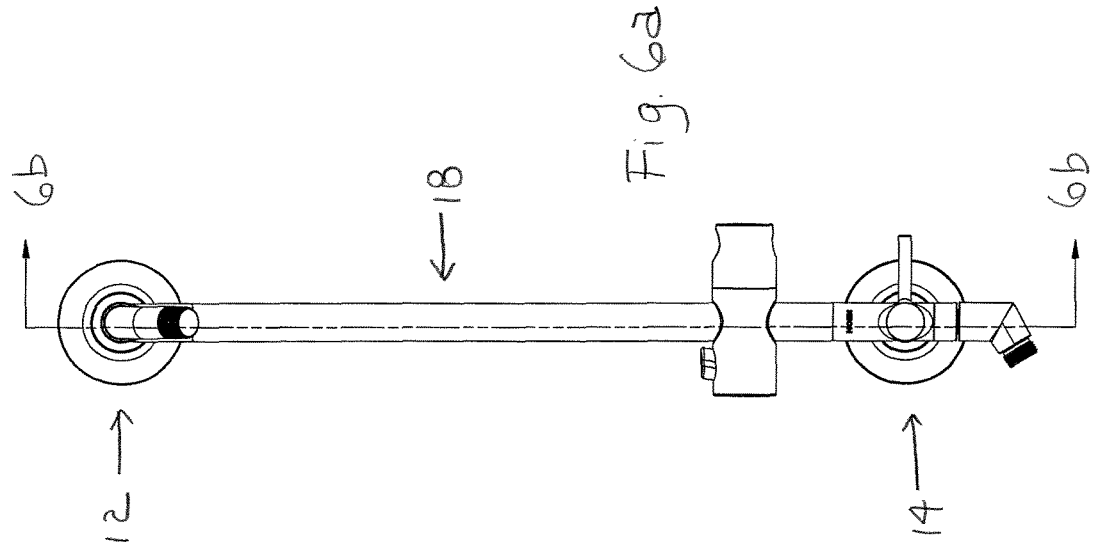

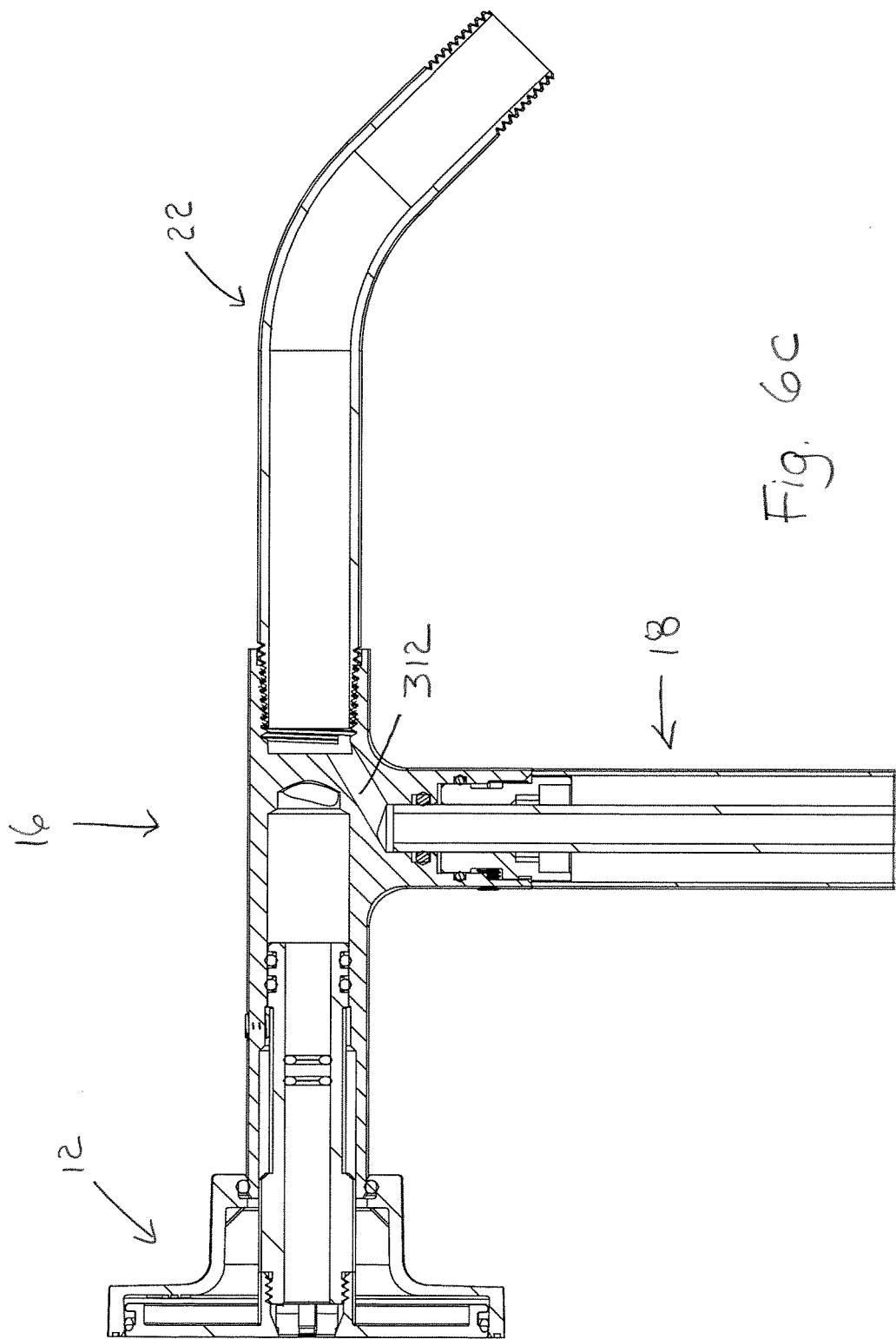

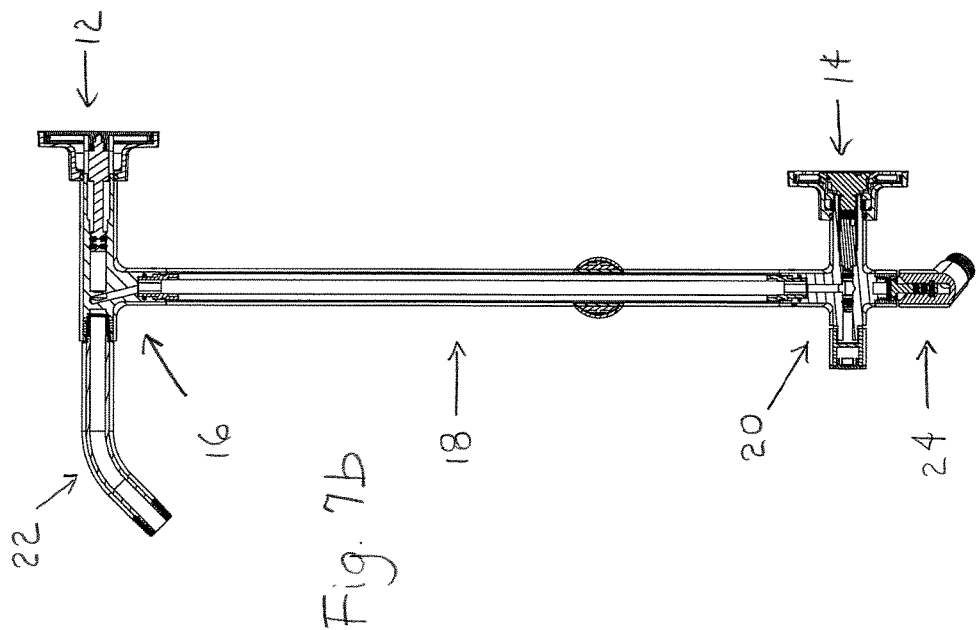
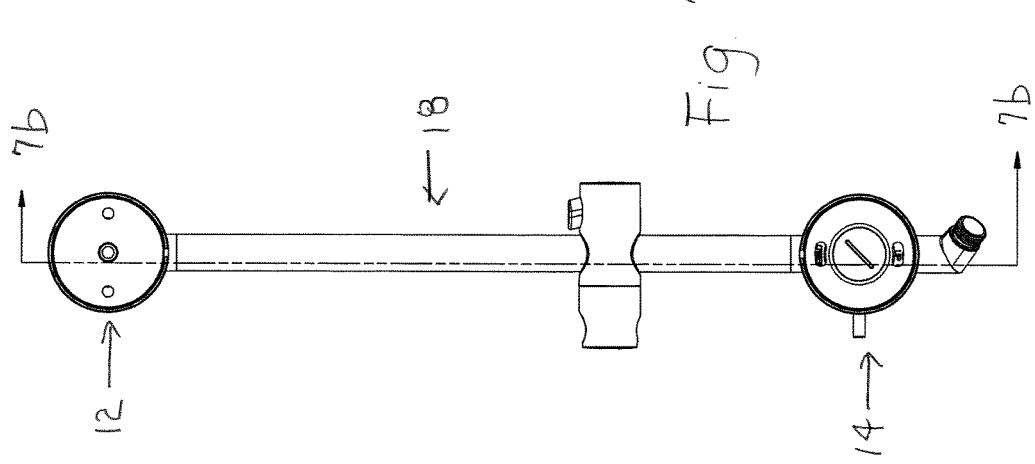

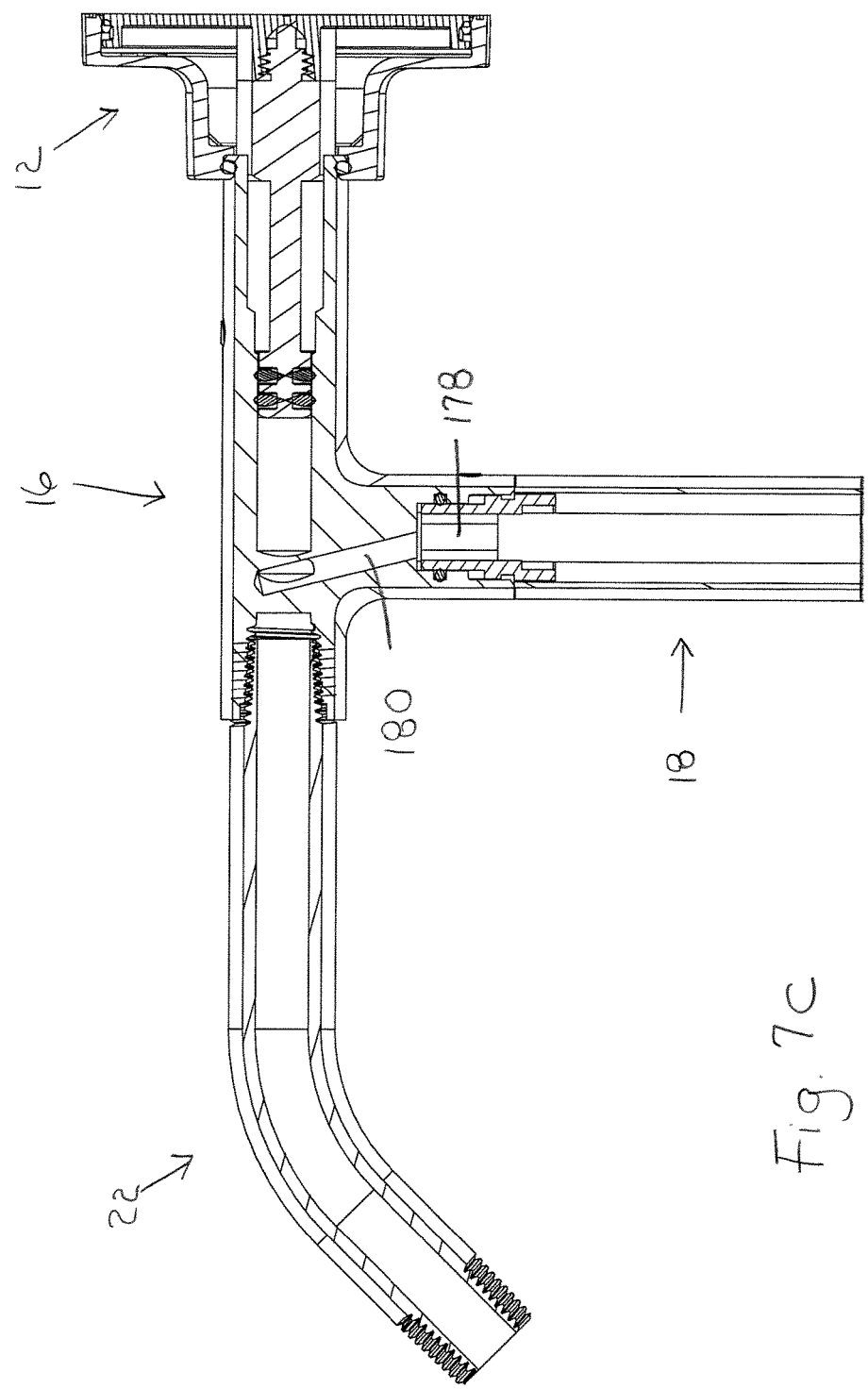

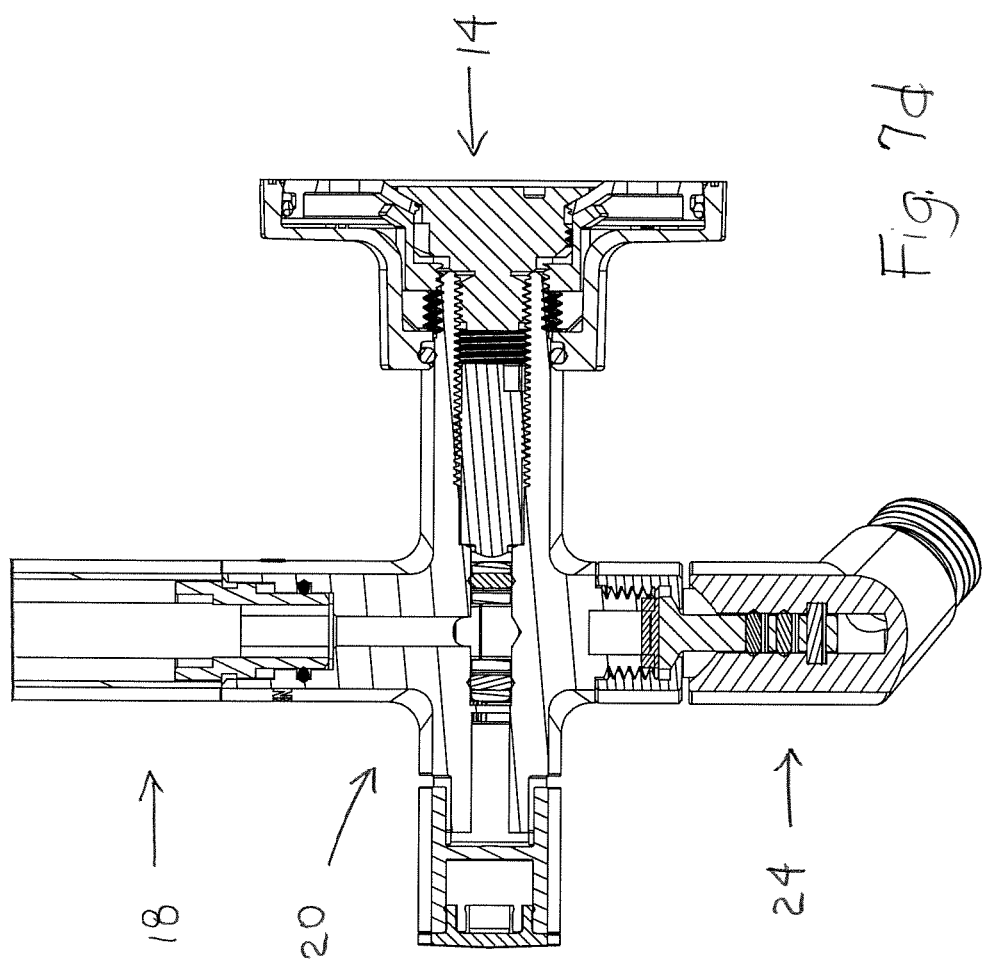

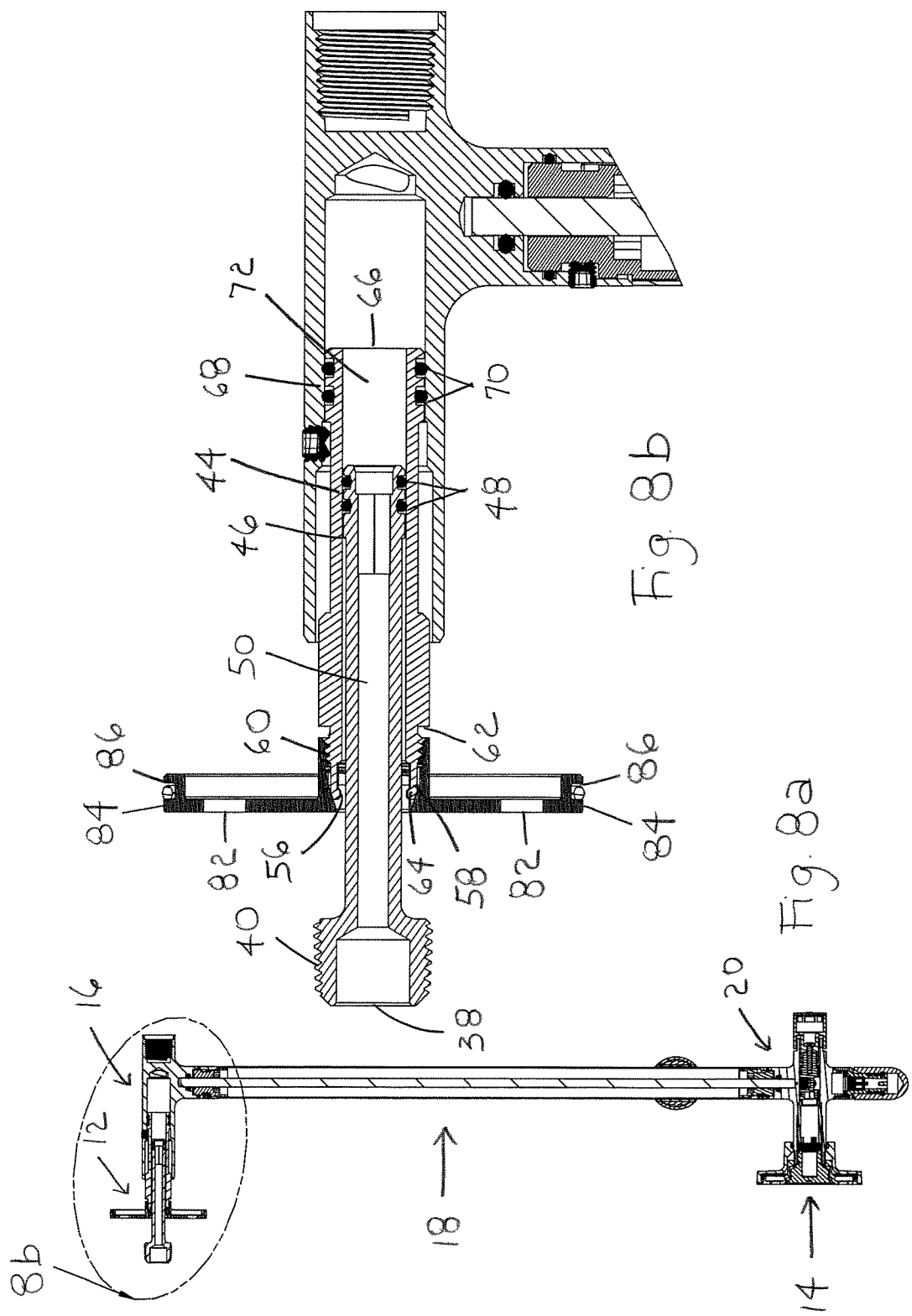

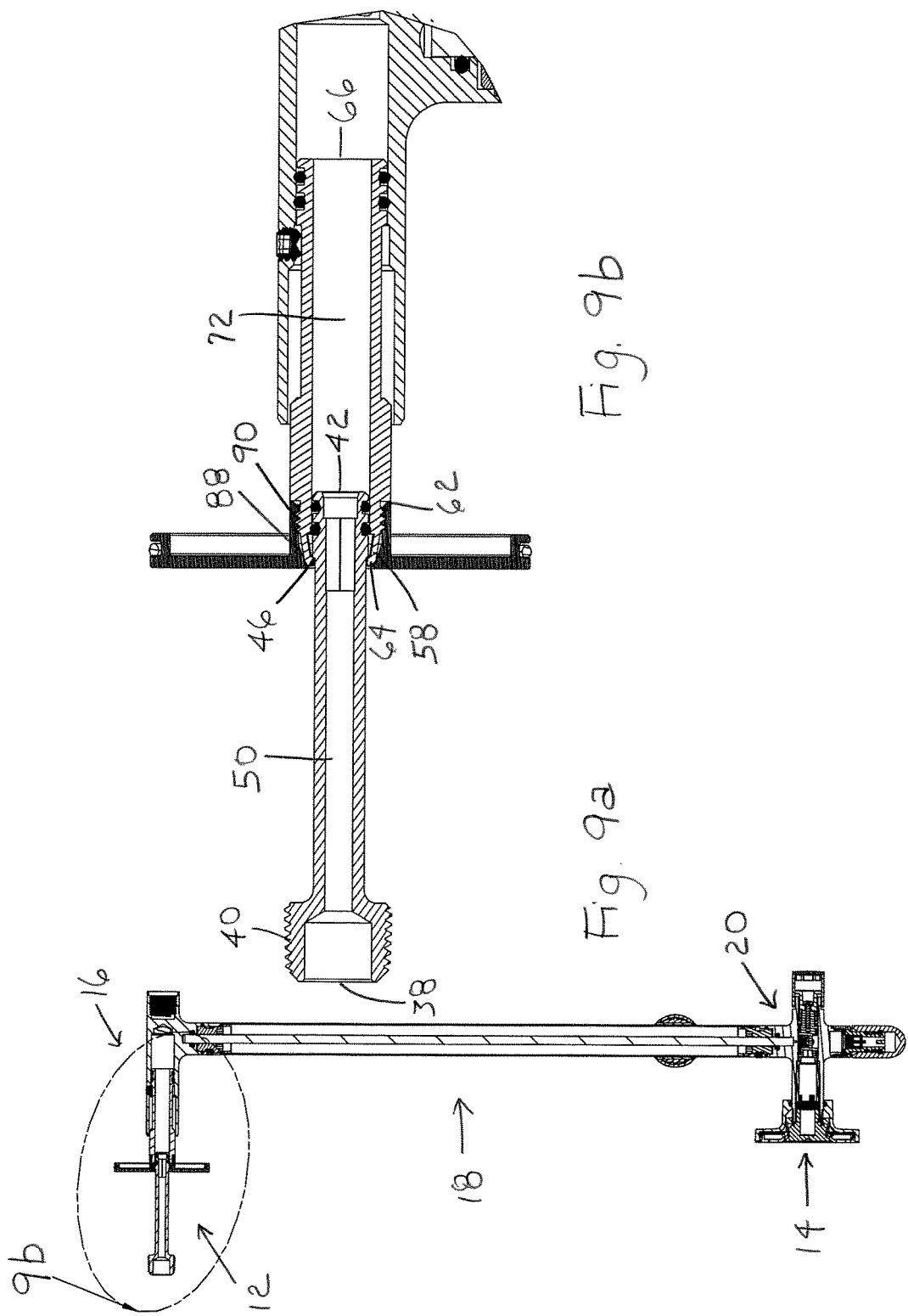

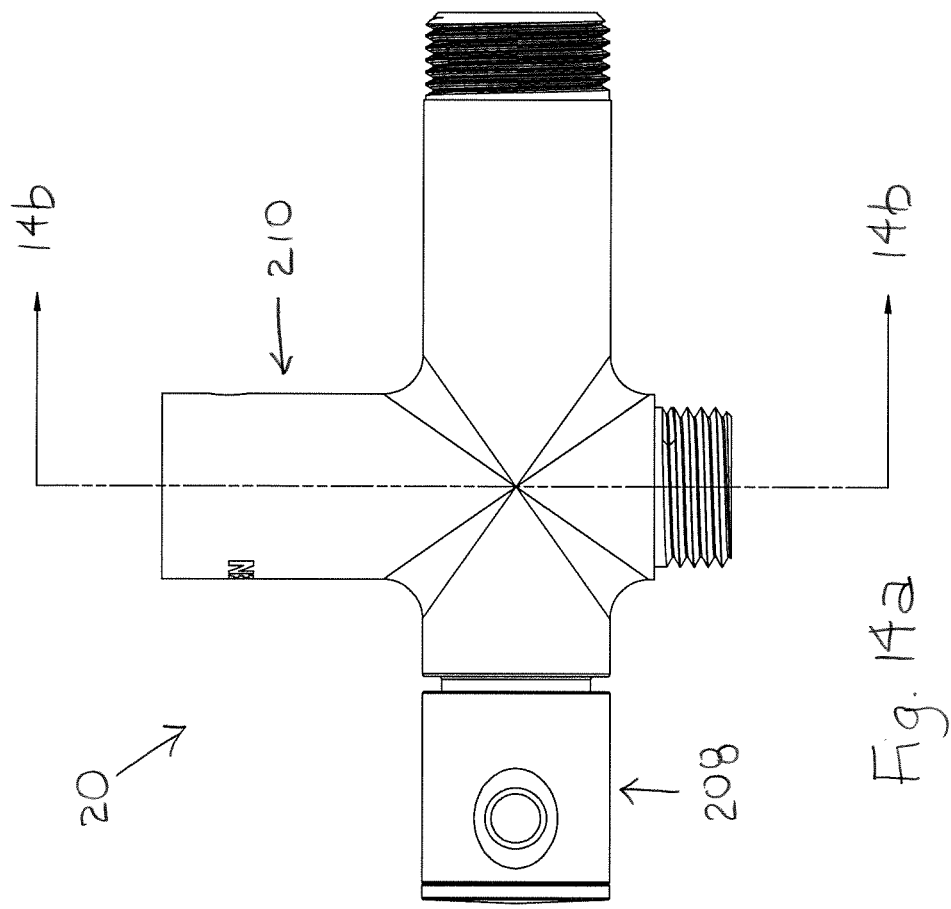
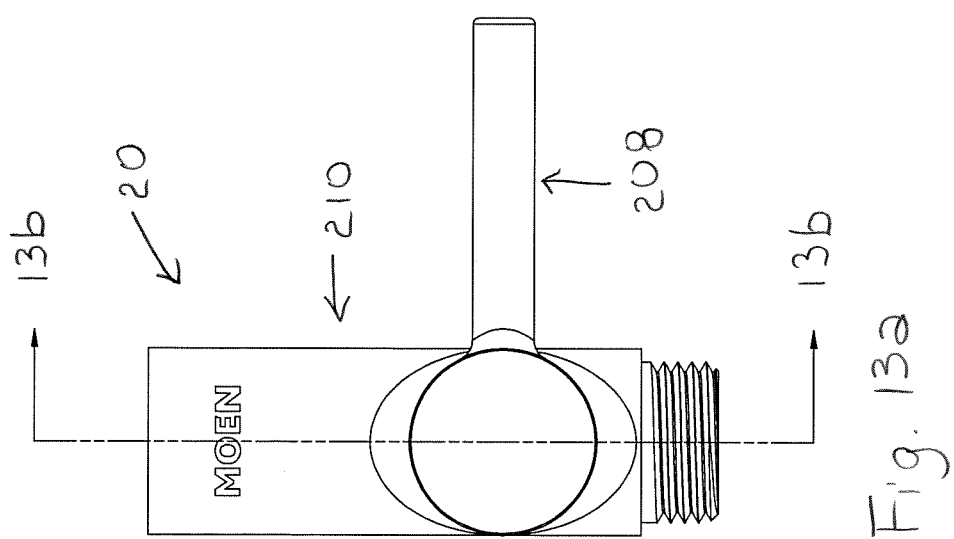

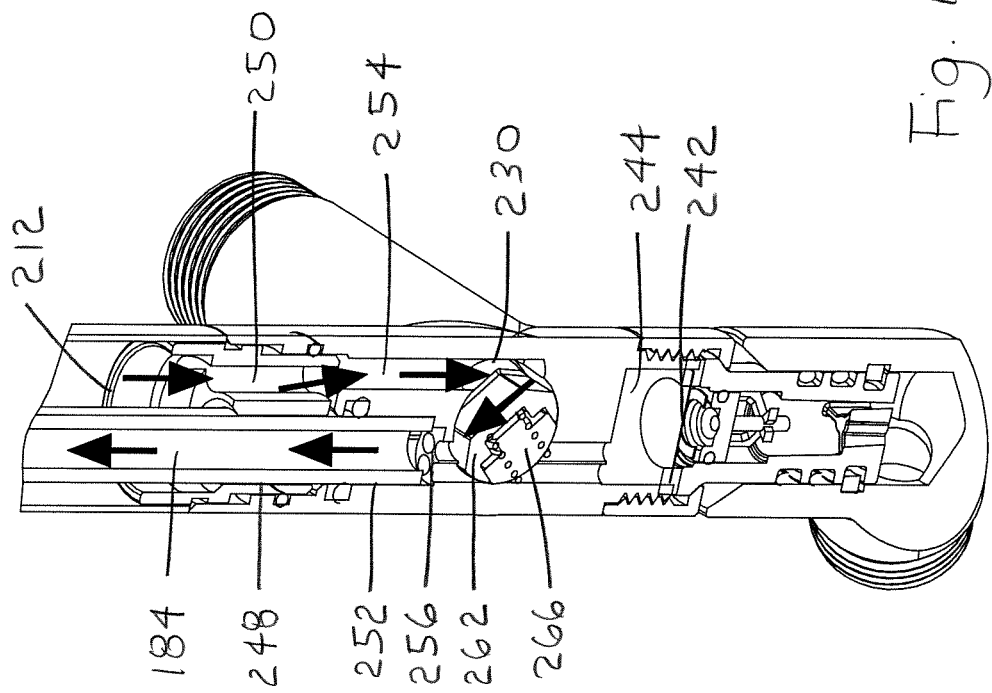

PLUMBING FIXTURE FITTING WITH MOUNTING SYSTEM

CROSS-REFERENCE TO RELATED APPLICATION

This application claims the benefit of U.S. Provisional Application No. 62/329,748, filed Apr. 29, 2016, the entire disclosure of which is hereby incorporated by reference.

FIELD

The present invention relates generally to a plumbing fixture fitting, and, more particularly, to a plumbing fixture fitting with a mounting system.

BACKGROUND

Plumbing fixture fittings can be difficult to mount and operate.

SUMMARY

The present invention provides a plumbing fixture fitting with a mounting system.

In an exemplary embodiment, the plumbing fixture fitting with mounting system includes a swivel member and a mounting member. The swivel member includes a rear portion and a front portion. The rear portion includes a front surface. The front portion includes a threaded outer surface. The mounting member includes a back plate, an inner rim, and an opening. The back plate includes a mounting hole. The inner rim includes a rear surface. The opening in the mounting member is operable to receive the swivel member. The front surface of the rear portion of the swivel member is operable to rotatably abut the rear surface of the inner rim of the mounting member. The threaded outer surface of the front portion of the swivel member is operable to be threaded into a valve body.

In an exemplary embodiment, the plumbing fixture fitting with mounting system includes a swivel member, a mounting member, and a securing member. The swivel member includes a rear portion, an intermediate portion, and a front portion. The rear portion includes a front surface. The intermediate portion includes a non-threaded rear outer surface and a threaded front outer surface. The front portion includes a threaded outer surface. The mounting member includes a back plate, an inner rim, and an opening. The back plate includes a mounting hole. The inner rim includes a rear surface, a front surface, and a threaded inner surface. The securing member includes a rear portion, a front portion, and an opening. The rear portion includes a rear surface. The front portion includes a threaded inner surface. The threaded front outer surface of the intermediate portion of the swivel member is operable to be threaded through the threaded inner surface of the inner rim of the mounting member until the threaded front outer surface of the intermediate portion of the swivel member no longer engages the threaded inner surface of the inner rim of the mounting member. The front surface of the rear portion of the swivel member is operable to rotatably abut the rear surface of the inner rim of the mounting member. The front surface of the inner rim of the mounting member is operable to rotatably abut the rear surface of the rear portion of the securing member. The threaded outer surface of the front portion of the swivel member is operable to be threaded into a valve body. The threaded inner surface of the front portion of the securing member is operable to be threaded onto the valve body.

In an exemplary embodiment, the plumbing fixture fitting with mounting system includes an inner shank, an outer shank, and a mounting member. The inner shank includes a rear end portion and a front end portion. The rear end portion includes a rear opening and a threaded rear outer surface. The front end portion includes a front opening. The inner shank includes a passageway between the rear opening and the front opening. The outer shank includes a rear end portion and a front end portion. The rear end portion includes a rear opening, a plurality of fingers, and a threaded rear outer surface. The front end portion includes a front opening. The outer shank includes a passageway between the rear opening and the front opening. The mounting member includes a back plate, an inner rim, and an opening. The back plate includes a mounting hole. The inner rim includes a tapered rear inner surface and a threaded front inner surface. The threaded rear outer surface of the rear end portion of the inner shank is operable to be threaded into a water supply pipe. The opening in the mounting member is operable to receive the inner shank. The passageway in the outer shank is operable to receive the front end portion of the inner shank. The inner rim of the mounting member is operable to receive the rear end portion of the outer shank. The threaded rear outer surface of the rear end portion of the outer shank is operable to be threaded into the threaded front inner surface of the inner rim of the mounting member. The fingers on the rear end portion of the outer shank are operable to deform inside the tapered rear inner surface of the inner rim of the mounting member as the threaded rear outer surface of the rear end portion of the outer shank is threaded into the threaded front inner surface of the inner rim of the mounting member. The front end portion of the outer shank is operable to be received in a valve body.

BRIEF DESCRIPTION OF THE DRAWINGS

FIGS. 5a-5d are views of components of the showering system of FIG. 1-FIG. 5a is a front view, FIG. 5b is a cross-sectional side view taken along the line 5b-5b in FIG. 5a, FIG. 5c is a detailed view of an upper portion of FIG. 5b, and FIG. 5d is a detailed view of a lower portion of FIG. 5b;

FIGS. 6a-6d are views of components of the showering system of FIG. 1-FIG. 6a is a front view, FIG. 6b is a cross-sectional side view taken along the line 6b-6b in FIG. 6a, FIG. 6c is a detailed view of an upper portion of FIG. 6b, and FIG. 6d is a detailed view of a lower portion of FIG. 6b;

FIGS. 7a-7d are views of components of the showering system of FIG. 1-FIG. 7a is a rear view, FIG. 7b is a cross-sectional side view taken along the line 7b-7b in FIG. 7a, FIG. 7c is a detailed view of an upper portion of FIG. 7b, and FIG. 7d is a detailed view of a lower portion of FIG. 7b;

FIGS. 8a-8b are views of components of the showering system of FIG. 1-FIG. 8a is a cross-sectional side view similar to FIG. 5b, and FIG. 8b is a detailed view of a circled portion of FIG. 8a showing an inner shank received in an outer shank;

FIGS. 9a-9b are views of components of the showering system of FIG. 1-FIG. 9a is a cross-sectional side view similar to FIG. 8a, and FIG. 9b is a detailed view of a circled portion of FIG. 9a showing the inner shank received in an outermost position in the outer shank;

-FIG. 10a is a cross-sectional side view showing the lower mounting assembly mounted on a vertical mounting surface, and FIG. 10b is a cross-sectional side view showing the lower mounting assembly mounted on a mounting surface two degrees off vertical;

FIGS. 13a-13b are views of the components of the lower valving assembly of FIG. 11-FIG. 13a is a front view, and FIG. 13b is a cross-sectional side view taken along the line 13b-13b in FIG. 13a;

FIGS. 14a-14b are views of the components of the lower valving assembly of FIG. 11-FIG. 14a is a side view, and FIG. 14b is a cross-sectional front view taken along the line 14b-14b in FIG. 14a; and FIGS. 15a-15c are views of components of the slide bar assembly, the lower valving assembly, and the handshower assembly of FIG. 1-FIG. 15a is a cross-sectional perspective view of the components showing fluid flowing to the showerhead, FIG. 15b is a cross-sectional perspective view of the components showing fluid flowing to the handshower, and FIG. 15c is a cross-sectional front view of the components showing fluid flowing to both the showerhead and the handshower at a significantly reduced flow rate.

DETAILED DESCRIPTION

Figure 1:
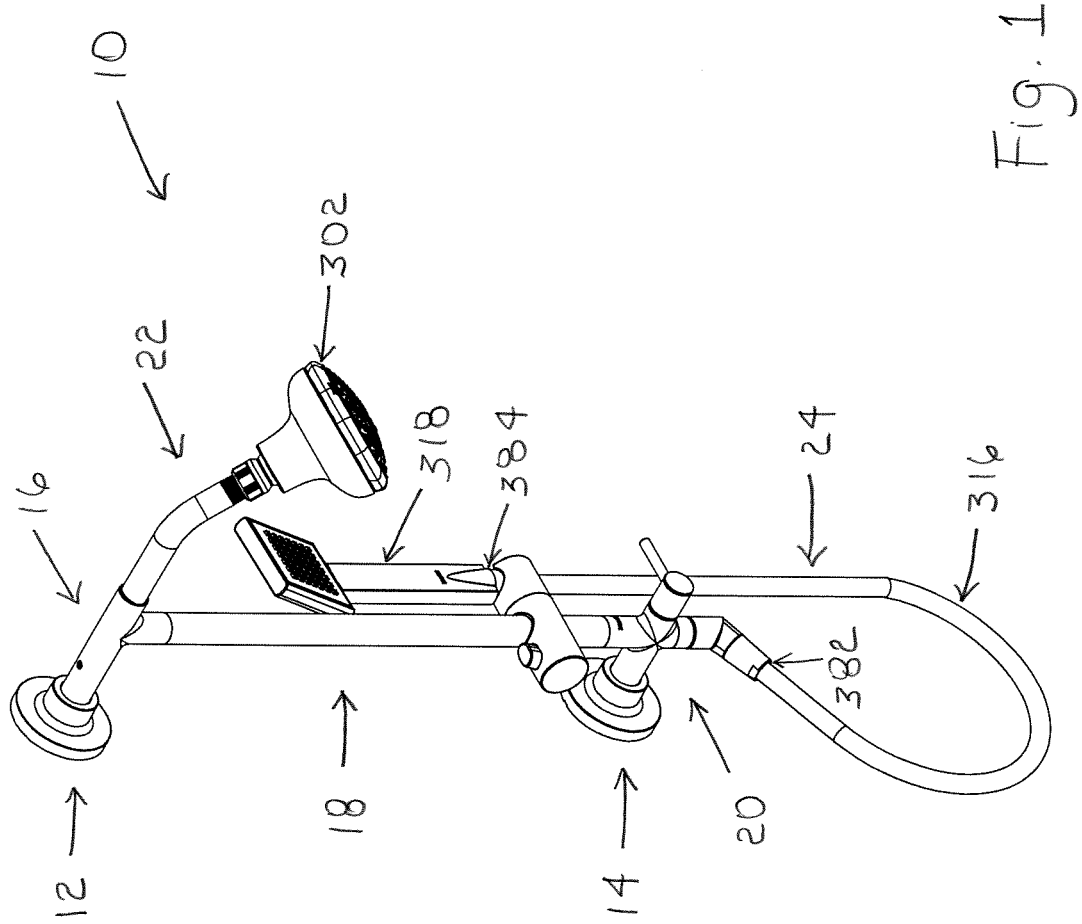
FIG. 1 is a perspective view of a showering system with a shower rail, including an upper mounting assembly, a lower mounting assembly, an upper valving assembly, a slide bar assembly, a lower valving assembly, a showerhead assembly, and a handshower assembly, according to an exemplary embodiment of the present invention.

The present invention provides a plumbing fixture fitting with a mounting system. In an exemplary embodiment, the plumbing fixture fitting is a showering system with a shower rail. However, one of ordinary skill in the art will appreciate that the mounting system could be used in other plumbing fixture fittings. An exemplary embodiment of a showering system 10 of the present invention is shown in FIGS. 1-15c. In the illustrated embodiment, the showering system 10 includes an upper mounting assembly 12, a lower mounting assembly 14, an upper valving assembly 16, a slide bar assembly 18, a lower valving assembly 20, a showerhead assembly 22, and a handshower assembly 24.

An exemplary embodiment of the upper mounting assembly 12 is shown in detail in FIGS. 1-15c, and particularly in FIGS. 3, 5c, 6c, 7c, 8b, and 9b. Exemplary components will be described. In the illustrated embodiment of FIGS. 1-15c, the upper mounting assembly 12 includes an inner shank 26, an outer shank 28, an upper mounting member 30, an upper escutcheon 32, various O-rings, and a set screw.

The inner shank 26 includes a rear end portion 34 and a front end portion 36. The rear end portion 34 of the inner shank 26 includes a rear opening 38 and a rear outer surface 40. The rear outer surface 40 of the rear end portion 34 of the inner shank 26 is threaded. The front end portion 36 of the inner shank 26 includes a front opening 42, a front outer surface 44, and a shoulder 46. The front outer surface 44 of the front end portion 36 of the inner shank 26 includes two O-ring grooves 48. The inner shank 26 includes a passageway 50 extending between the rear opening 38 and the front opening 42 in the inner shank 26.

The outer shank 28 includes a rear end portion 52 and a front end portion 54. The rear end portion 52 of the outer shank 28 includes a rear opening 56, four fingers 58, a rear outer surface 60, and a shoulder 62. A free end of each finger 58 on the rear end portion 52 of the outer shank 28 includes an inwardly projecting bump 64. The rear outer surface 60 of the rear end portion 52 of the outer shank 28 is threaded. The front end portion 54 of the outer shank 28 includes a front opening 66 and a front outer surface 68. The front outer surface 68 of the front end portion 54 of the outer shank 28 includes two O-ring grooves 70. The outer shank 28 includes a passageway 72 extending between the rear opening 56 and the front opening 66 in the outer shank 28.

The upper mounting member 30 includes a back plate 74, an outer rim 76, an inner rim 78, and a central opening 80. The back plate 74 of the upper mounting member 30 includes two mounting holes 82. The outer rim 76 of the upper mounting member 30 includes an outer surface 84. The outer surface of the outer rim 76 of the upper mounting member 30 includes an O-ring groove 86. The inner rim 78 of the upper mounting member 30 includes a rear inner surface 88 and a front inner surface 90. The rear surface 88 of the inner rim 78 of the upper mounting member 30 is tapered. The front inner surface 90 of the inner rim 78 of the upper mounting member 30 is threaded. The upper escutcheon 32 includes a central opening 92.

The upper mounting member 30 is operable to be attached to a mounting surface, such as a shower wall. The upper escutcheon 32 is operable to be mounted over the upper mounting member 30. The central opening 80 in the upper mounting member 30 and the central opening 92 in the upper escutcheon 32 are operable to receive the outer shank 28 extending therethrough. The passageway 72 in the outer shank 28 is operable to receive the inner shank 26 extending therethrough. The passageway 50 in the inner shank 26 is operable to receive fluid flowing therethrough from a fluid supply. The passageway 72 in the outer shank 28 is operable to receive fluid flowing therethrough from the passageway 50 in the inner shank 26.

An exemplary embodiment of the lower mounting assembly 14 is shown in detail in FIGS. 1-15c, and particularly in FIGS. 4, 5d, 6d, 7d, and 10a-10b. Exemplary components will be described. In the illustrated embodiment of FIGS. 1-15c, the lower mounting assembly 14 includes a swivel member 94, a lower mounting member 96, a securing member 98, a lower escutcheon 100, and various O-rings.

The swivel member 94 includes a rear portion 102, an intermediate portion 104, and a front portion 106. The rear portion 102 of the swivel member 94 includes a front surface 108. The front surface 108 of the rear portion 102 of the swivel member 94 is spherical. The intermediate portion 104 of the swivel member 94 is generally cylindrical and includes a rear outer surface 110 and a front outer surface 112. The rear outer surface 110 of the intermediate portion 104 of the swivel member 94 is non-threaded. The front outer surface 112 of the intermediate portion 104 of the swivel member 94 is threaded. The front portion 106 of the swivel member 94 is generally cylindrical and includes an outer surface 114. The outer surface 114 of the front portion 106 of the swivel member 94 is threaded.

The lower mounting member 96 includes a back plate 116, an outer rim 118, an inner rim 120, and a central opening 122. The back plate 116 of the lower mounting member 96 includes two mounting holes 124. The outer rim 118 of the lower mounting member 96 includes an outer surface 126. The outer surface 126 of the outer rim 118 of the lower mounting member 96 includes an O-ring groove 128. The inner rim 120 of the lower mounting member 96 includes a rear surface 130, a front surface 132, and an inner surface 134. The rear surface 130 of the inner rim 120 of the lower mounting member 96 is spherical. The front surface 132 of the inner rim 120 of the lower mounting member 96 is spherical. The inner surface 134 of the inner rim 120 of the lower mounting member 96 is threaded.

The securing member 98 includes a rear portion 136, a front portion 138, and a central opening 140. The rear portion 136 of the securing member 98 includes a rear surface 142. The rear surface 142 of the rear portion 136 of the securing member 98 is spherical. The front portion 138 of the securing member 98 includes an inner surface 144. The inner surface 144 of the front portion 138 of the securing member 98 is threaded. The lower escutcheon 100 includes a central opening 146.

The intermediate portion 104 of the swivel member 94 is operable to extend through the central opening 122 in the lower mounting member 96. The spherical front surface 108 of the rear portion 102 of the swivel member 94 is operable to abut the spherical rear surface 130 of the inner rim 120 of the lower mounting member 96. The lower mounting member 96 is operable to be attached to the mounting surface. The spherical front surface 132 of the inner rim 120 of the lower mounting member 96 is operable to abut the spherical rear surface 142 of the rear portion 136 of the securing member 98. The threaded outer surface 114 of the front portion 106 of the swivel member 94 is operable to be threaded into the lower valving assembly 20. The threaded inner surface 144 of the front portion 138 of the securing member 98 is operable to be threaded onto the lower valving assembly 20. The lower escutcheon 100 is operable to be mounted over the swivel member 94, the lower mounting member 96, and the securing member 98.

An exemplary embodiment of the upper valving assembly 16 is shown in detail in FIGS. 1-15c, and particularly in FIGS. 3, 5c, 6c, 7c, 8b, and 9b. Exemplary components will be described. In the illustrated embodiment of FIGS. 1-15c, the upper valving assembly 16 includes an upper valve body 148, an O-ring, and a set screw. The upper valve body 148 includes an upper valve housing 150 and an upper valve insert 152. The upper valve housing 150 includes a longitudinal portion 154 and a transverse portion 156.

The longitudinal portion 154 of the upper valve housing 150 includes a rear end portion 158 and a front end portion 160. The rear end portion 158 of the longitudinal portion 154 of the upper valve housing 150 includes a rear opening 162. The front end portion 160 of the longitudinal portion 154 of the upper valve housing 150 includes a front opening 164. The longitudinal portion 154 of the upper valve housing 150 includes a longitudinal bore 166 extending inwardly from the rear opening 162. The longitudinal bore 166 in the longitudinal portion 154 of the upper valve housing 150 is operable to receive the outer shank 28. The longitudinal bore 166 in the longitudinal portion 154 of the upper valve housing 150 is operable to receive fluid flowing therethrough from the passageway 72 in the outer shank 28.

The transverse portion 156 of the upper valve housing 150 includes a bottom end portion 168. The bottom end portion 168 of the transverse portion 156 of the upper valve housing 150 includes a bottom opening 170. The transverse portion 156 of the upper valve housing 150 includes a transverse bore 172 extending inwardly from the bottom opening 170 and a tube passageway 174 extending inwardly from the transverse bore 172. The transverse bore 172 in the transverse portion 156 of the upper valve housing 150 is operable to receive the upper valve insert 152. The upper valve insert 152 includes a tube passageway 176 and a flow passageway 178. The flow passageway 178 in the upper valve insert 152 is in fluid communication with the longitudinal bore 166 in the longitudinal portion 154 of the upper valve housing 150 via a first passageway 180 in the upper valve housing 150.

Figure 2:
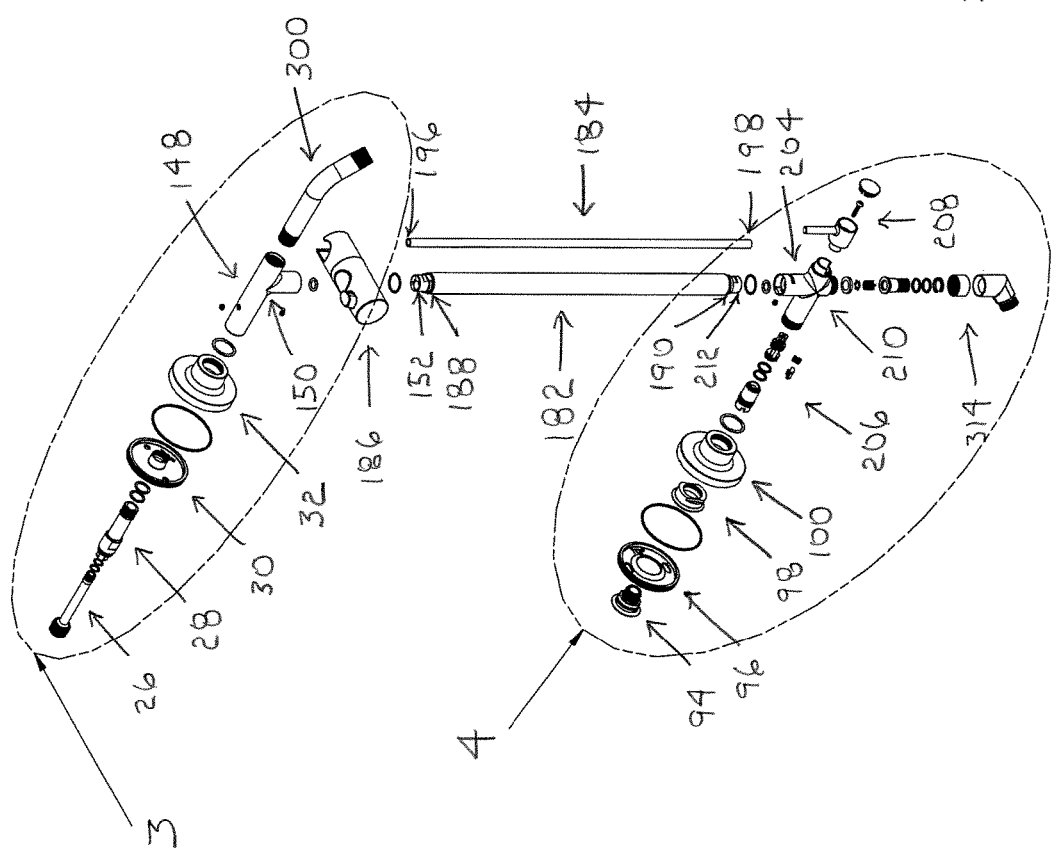
FIG. 2 is an exploded perspective view of the showering system of FIG. 1.
Figure 3:
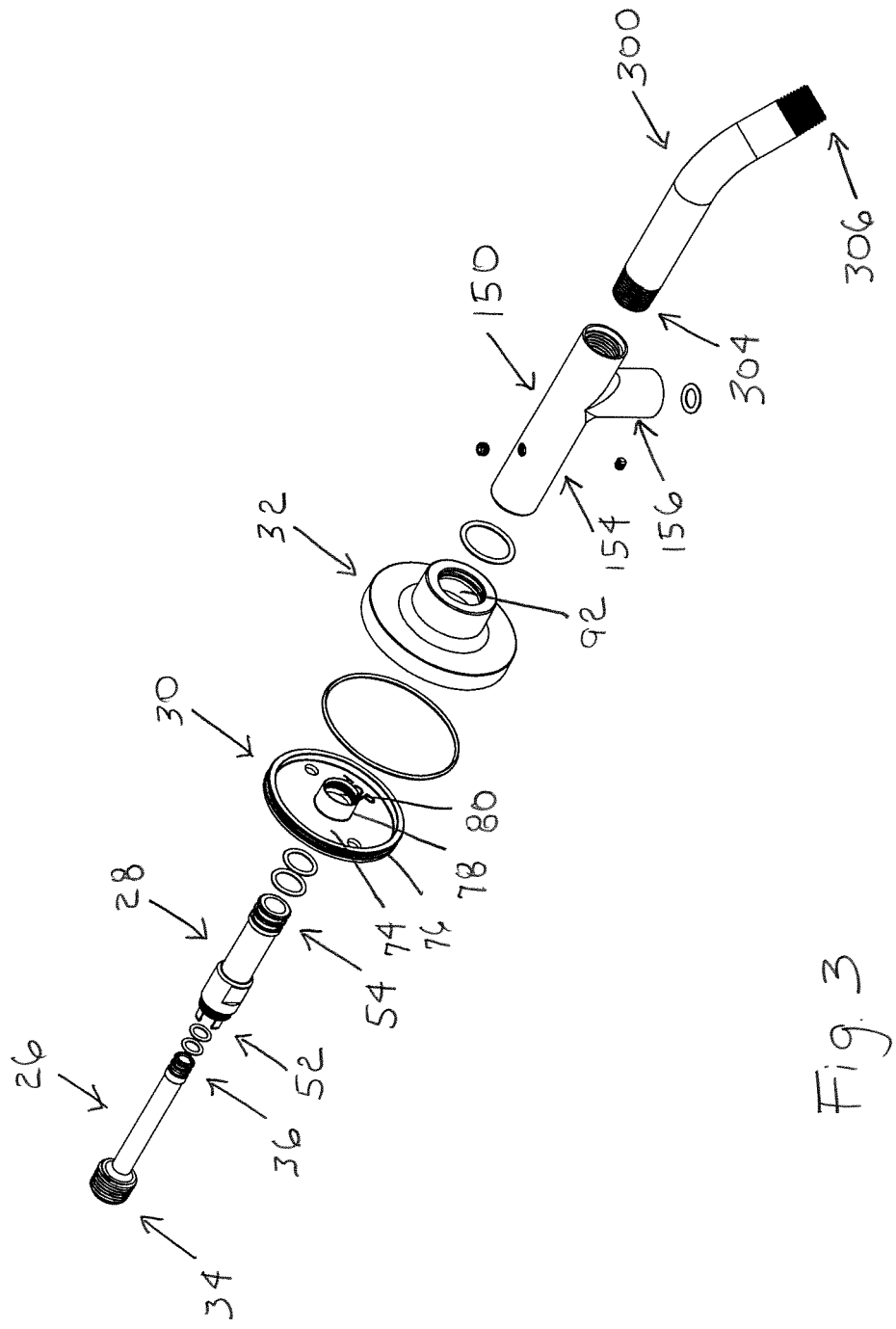
FIG. 3 is an exploded perspective view of components of the upper mounting assembly, the upper valving assembly, and the showerhead assembly of FIG. 1.
Figure 4:
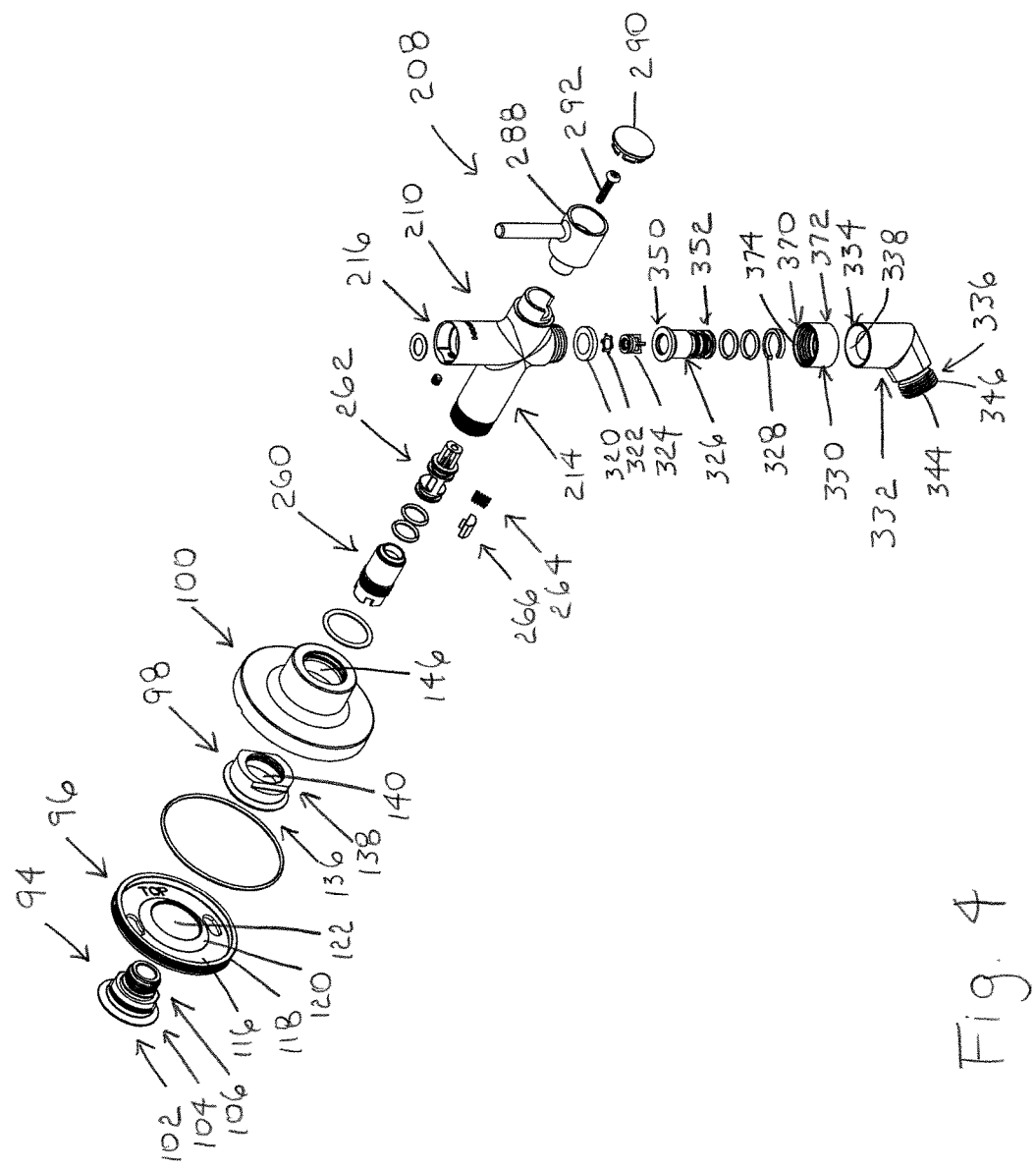
FIG. 4 is an exploded perspective view of components of the lower mounting assembly, the lower valving assembly, and the handshower assembly of FIG. 1.
Figure 5C:
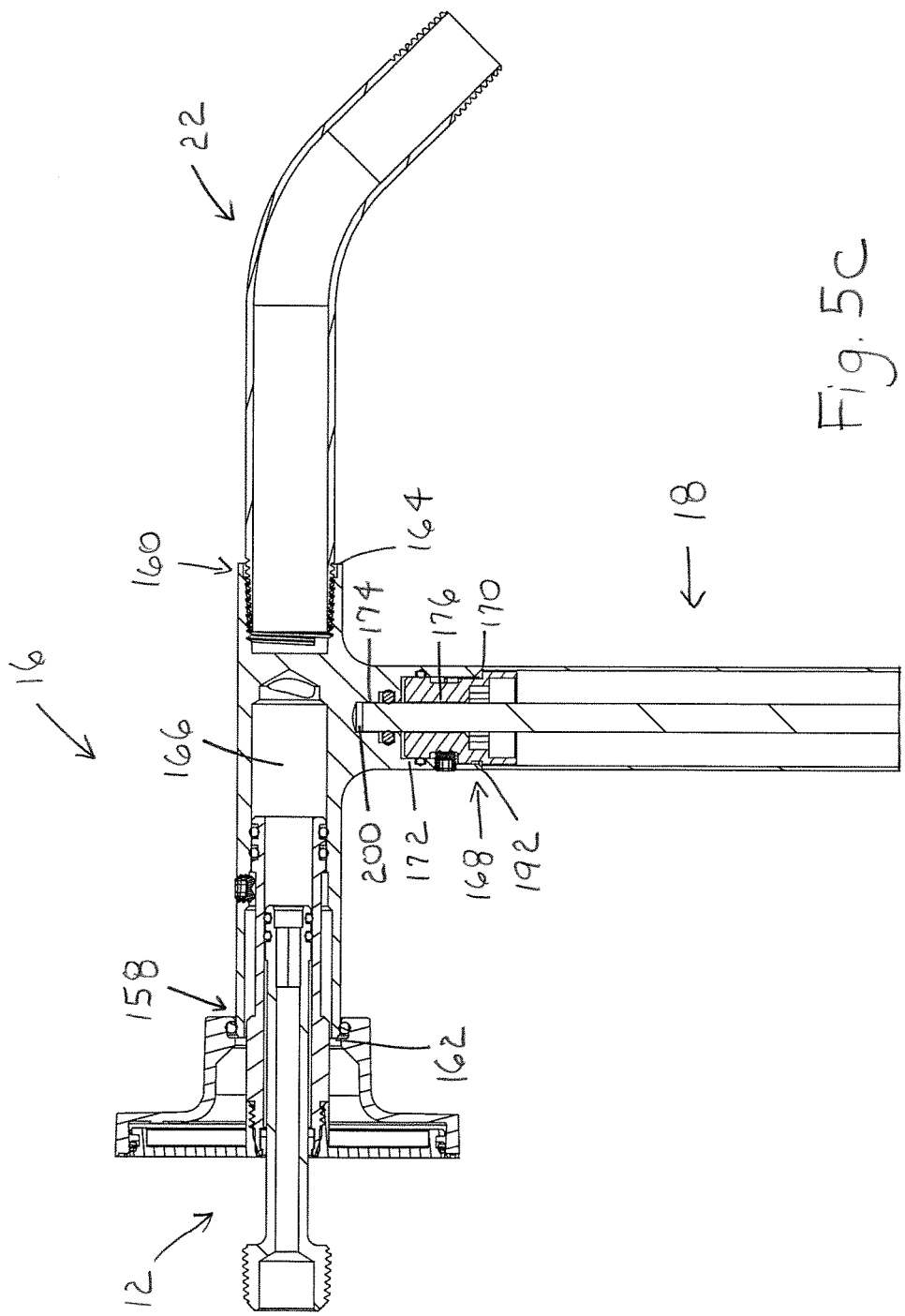
Figure 5D:
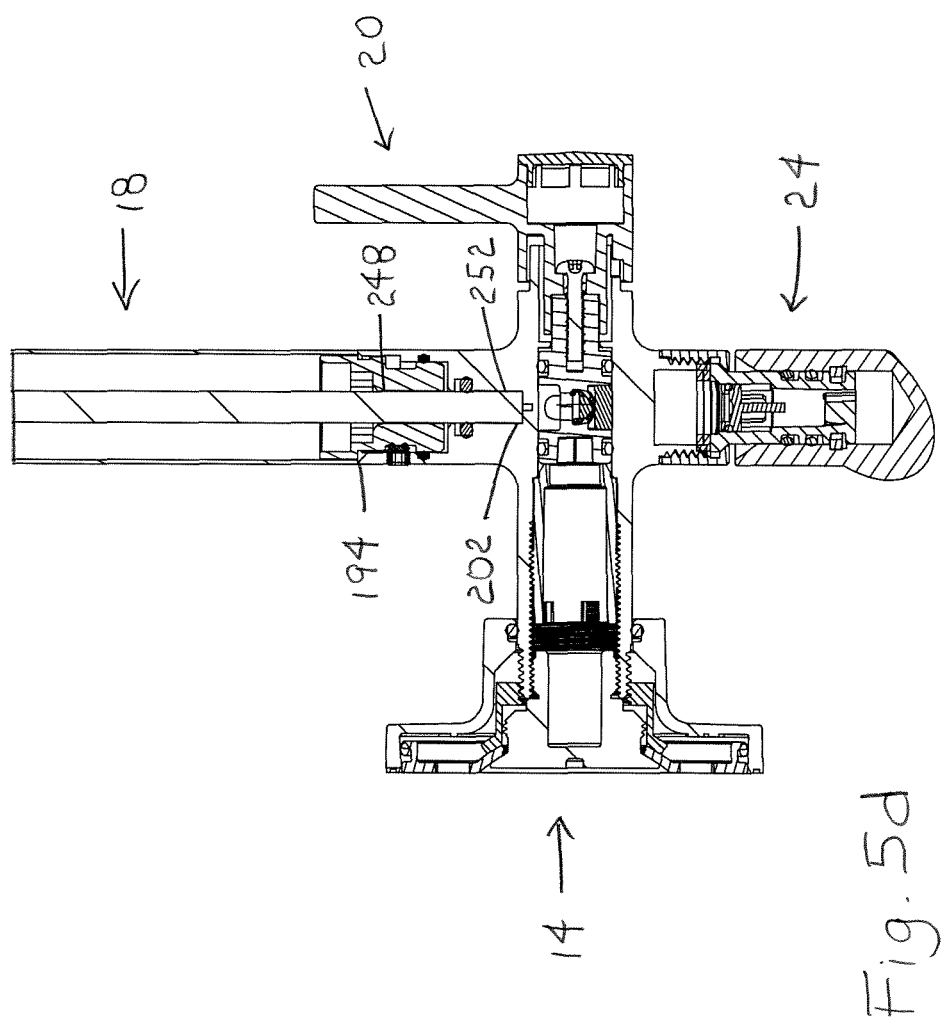
Figure 6D:
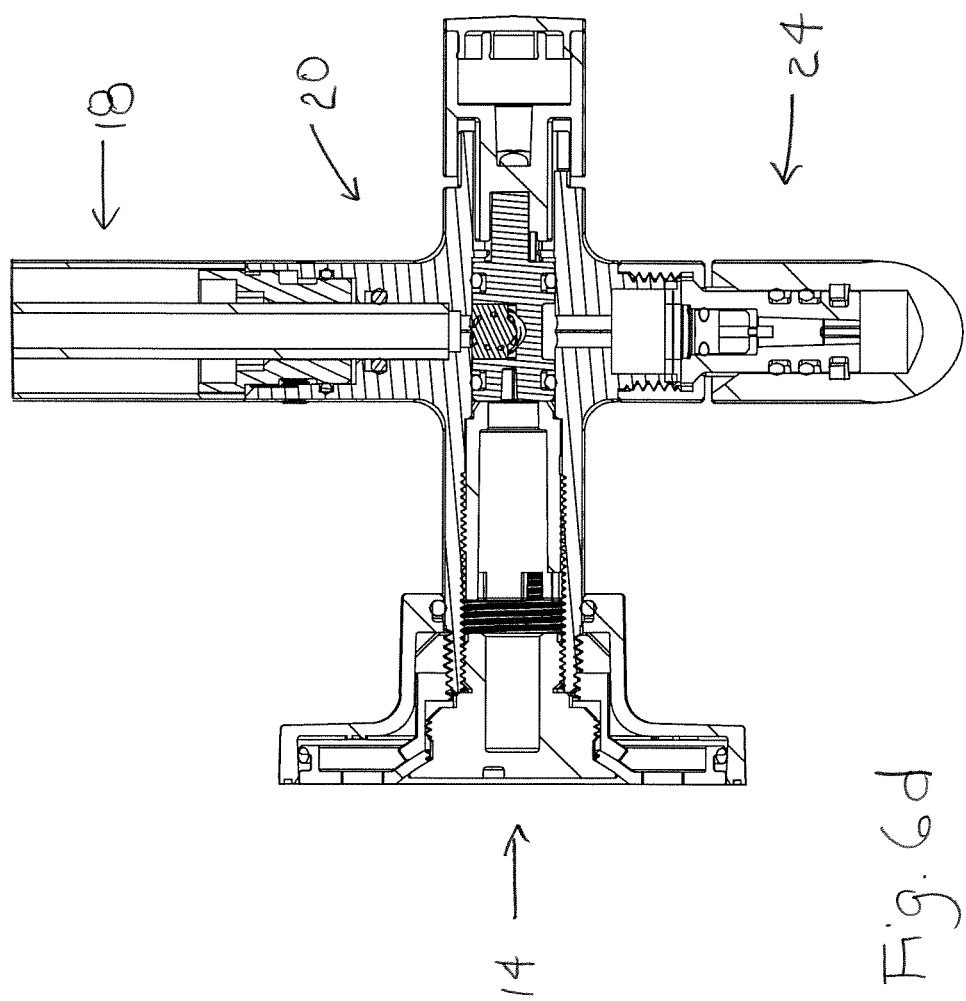
Figure 10A:
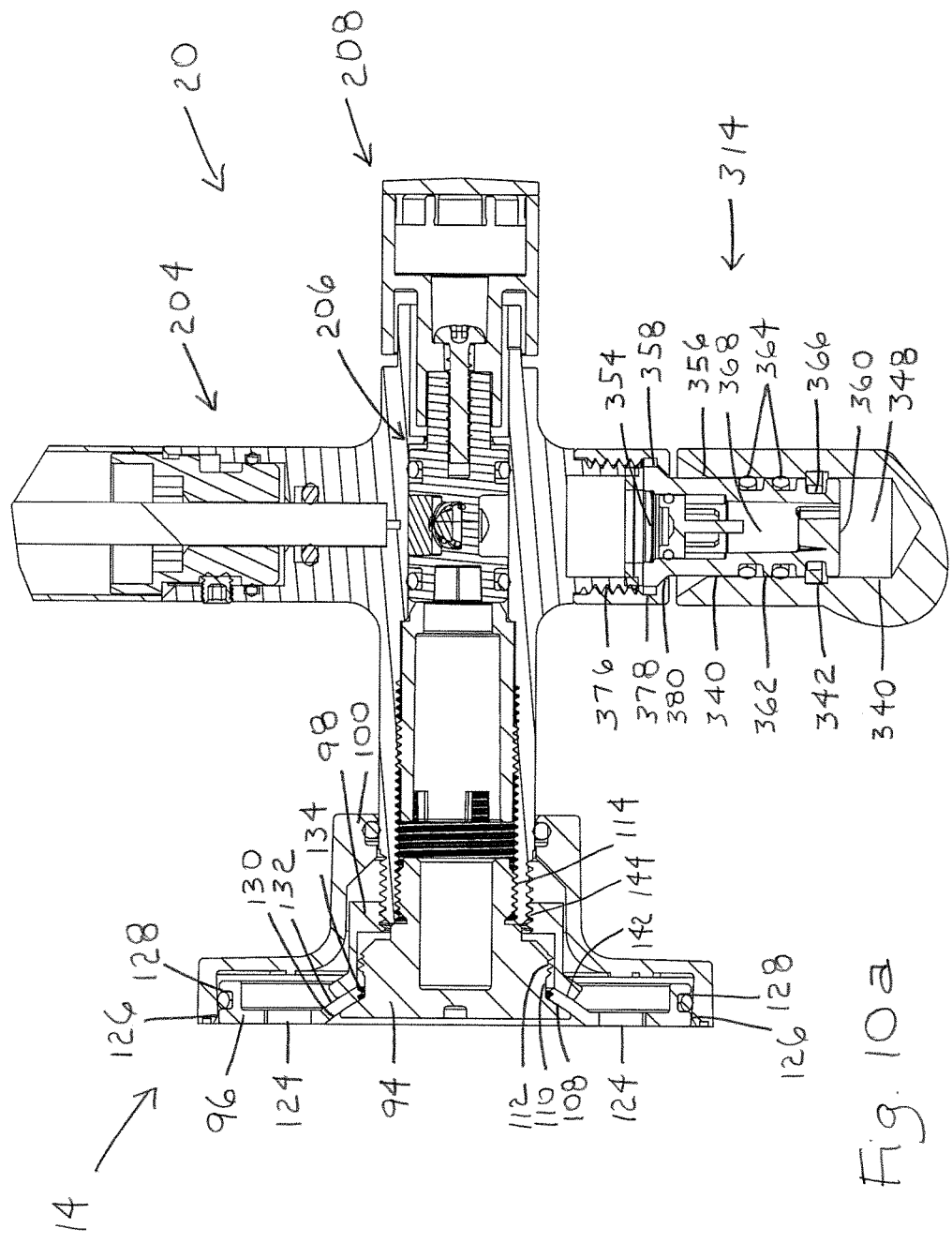
FIGS. 10a-10b are views of components of the showering system of FIG. 1
Figure 10B:
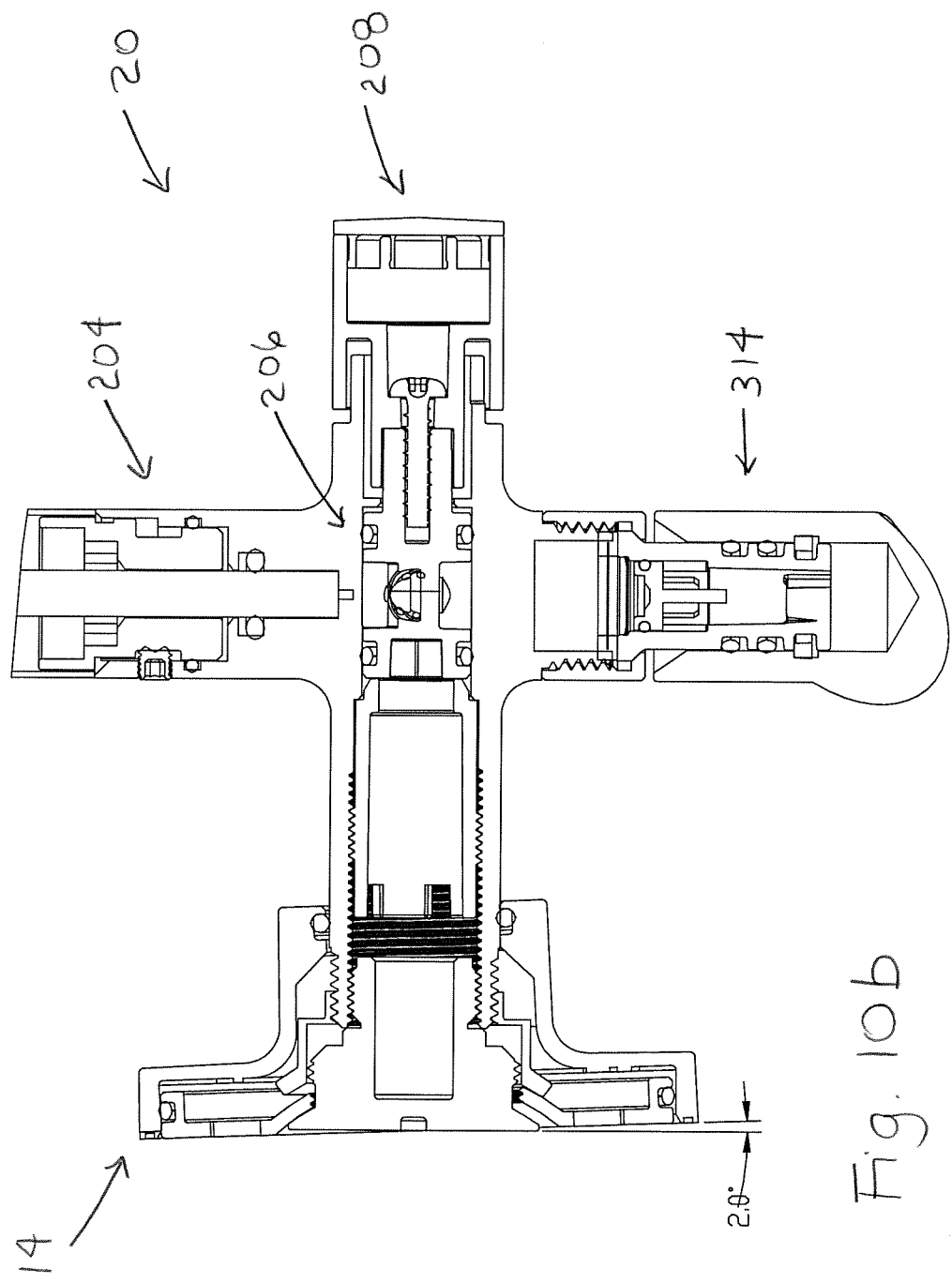
Figure 11:
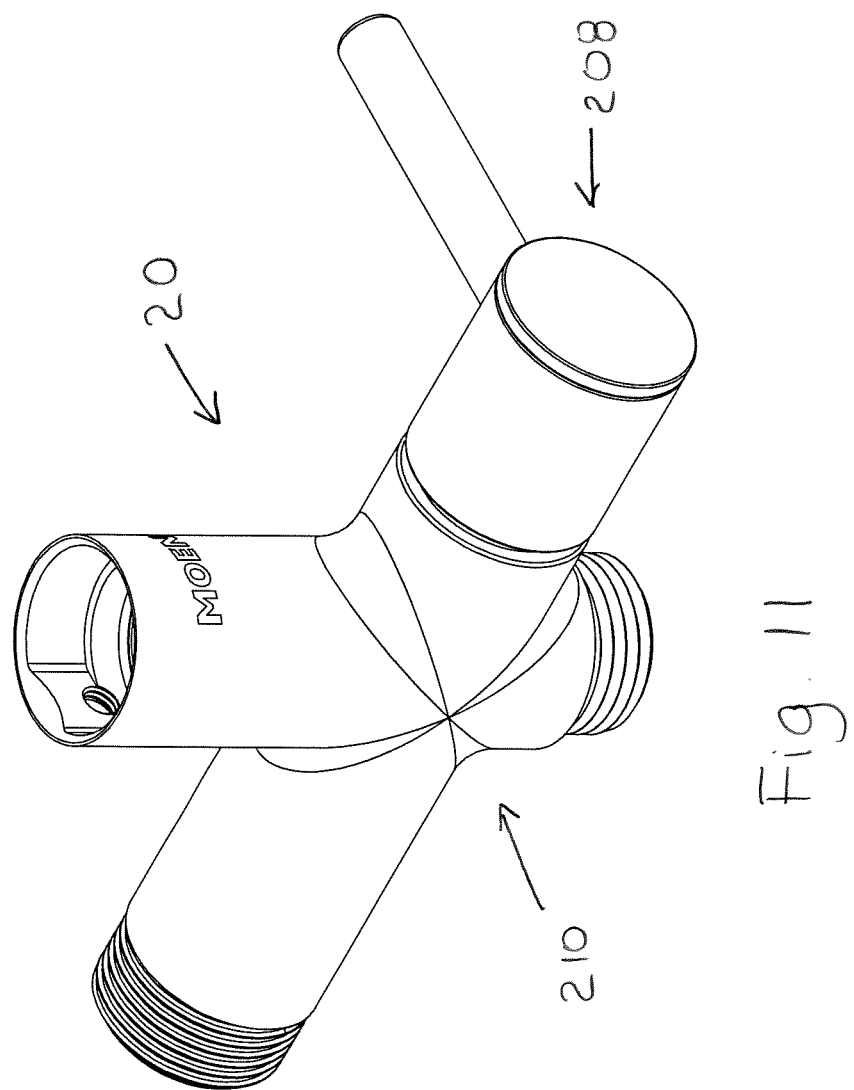
FIG. 11 is a perspective view of components of the lower valving assembly of FIG. 1.
Figure 12:
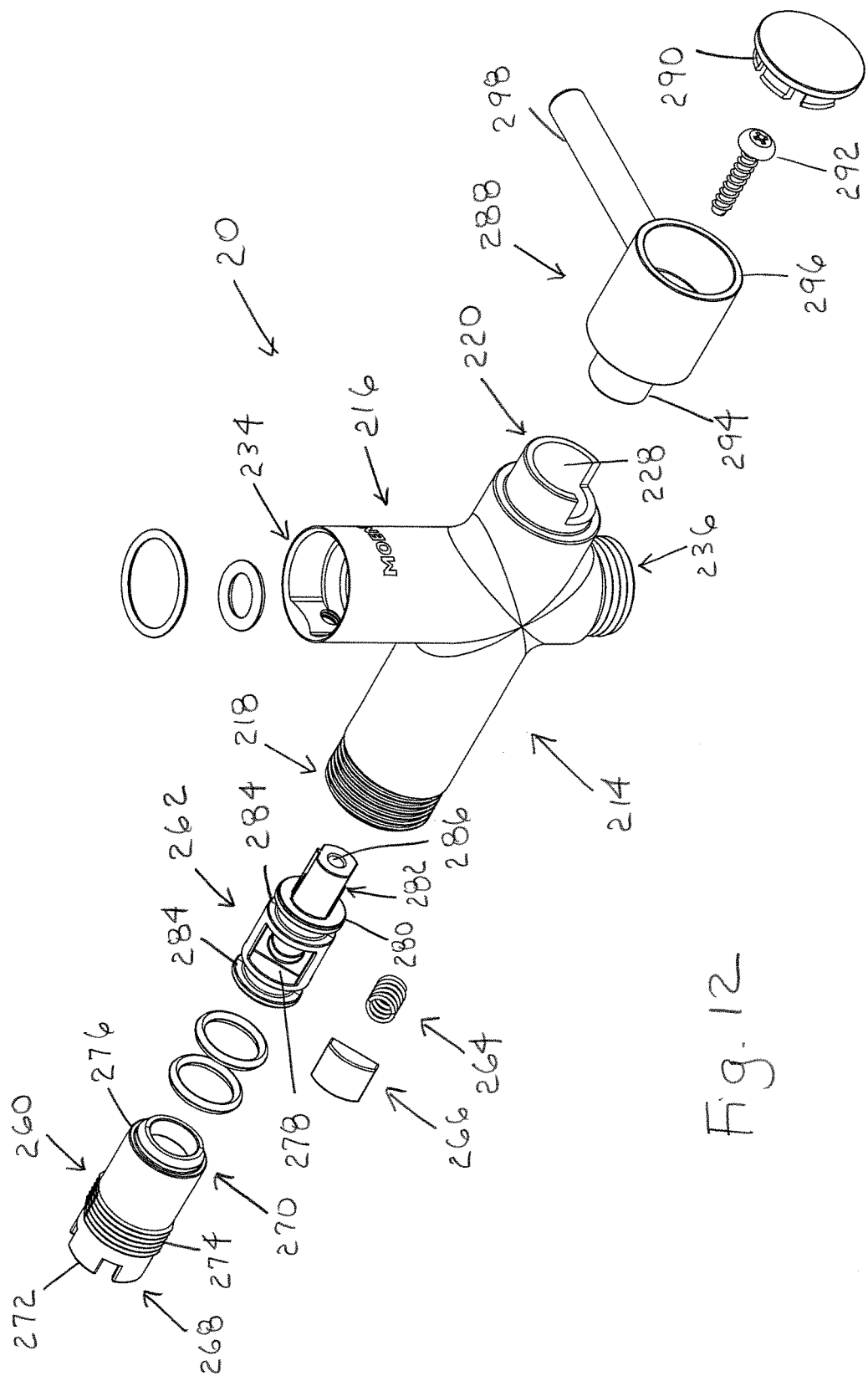
FIG. 12 is an exploded perspective view of the components of the lower valving assembly of FIG. 11.
Figure 13B:
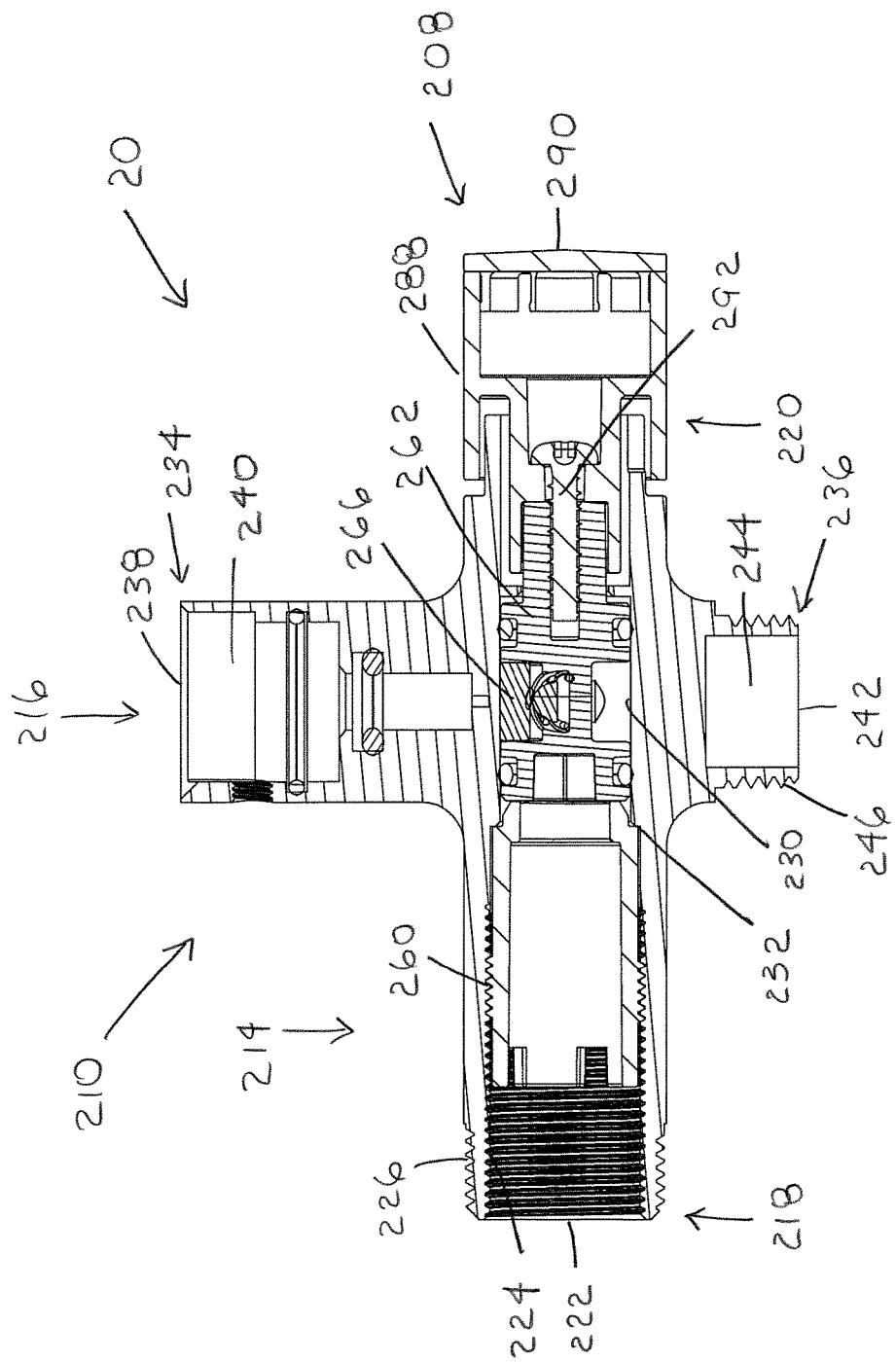
Figure 14B:
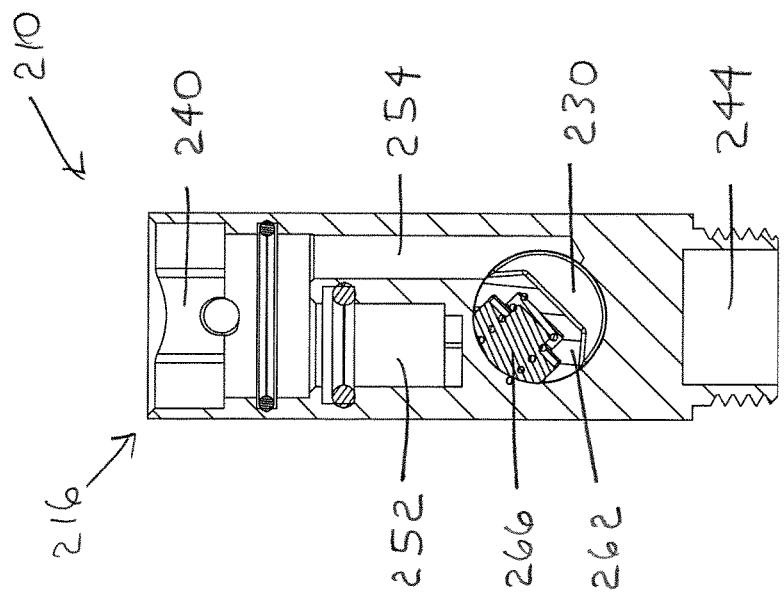
Figure 15B:
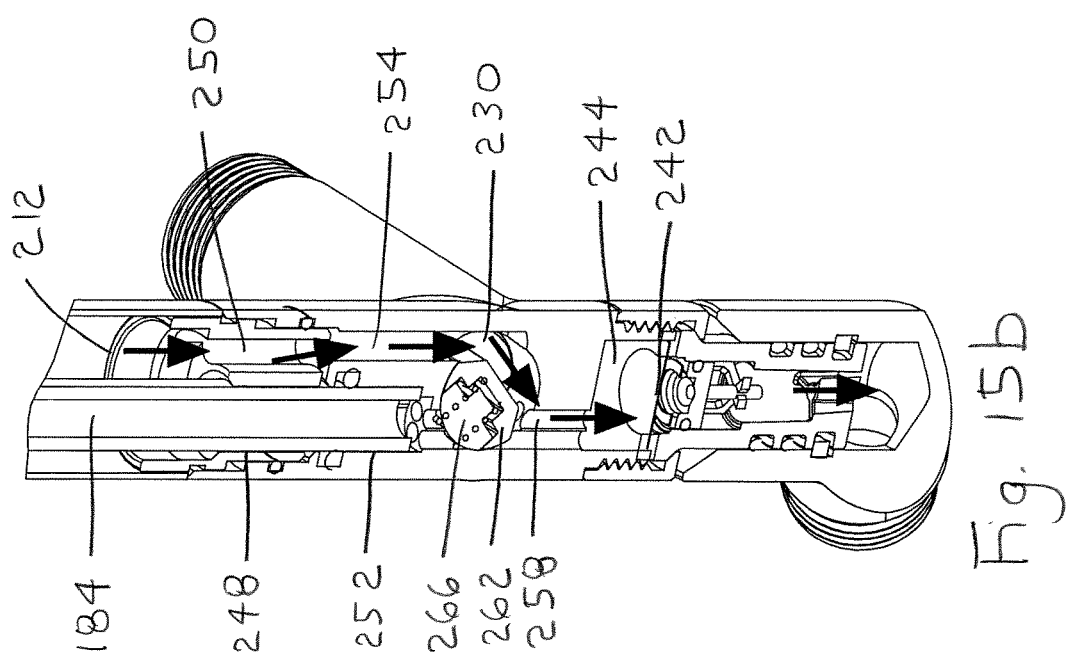
Figure 15C:
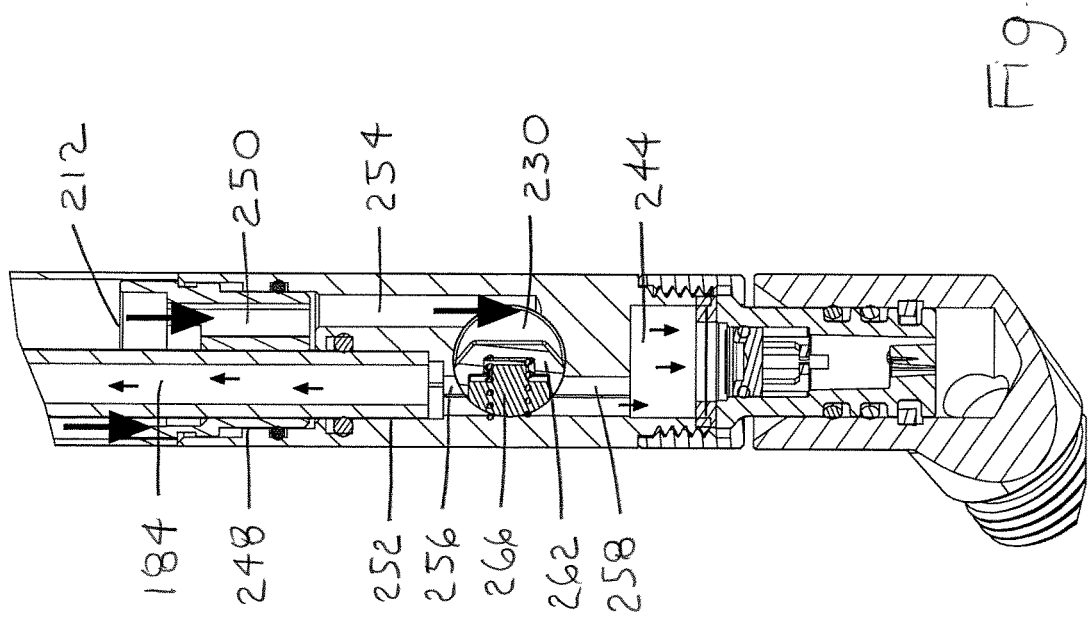

An exemplary embodiment of the slide bar assembly 18 is shown in detail in FIGS. 1-15c, and particularly in FIGS. 1 and 2. Exemplary components will be described. In the illustrated embodiment of FIGS. 1-15c, the slide bar assembly 18 includes an outer tube 182, an inner tube 184, and a slider cradle 186. The outer tube 182 includes an upper end portion 188 and a lower end portion 190. The upper end portion 188 of the outer tube 182 includes an upper opening 192. The lower end portion 190 of the outer tube 182 includes a lower opening 194. The outer tube 182 is hollow between the upper opening 192 and the lower opening 194, and is operable to have fluid flow therethrough. The inner tube 184 includes an upper end portion 196 and a lower end portion 198. The upper end portion 196 of the inner tube 184 includes an upper opening 200. The lower end portion 198 of the inner tube 184 includes a lower opening 202. The inner tube 184 is hollow between the upper opening 200 and the lower opening 202, and is operable to have fluid flow therethrough. The upper end portion 196 of the inner tube 184 is operable to be received in the tube passageway 176 in the upper valve insert 152 and the tube passageway 174 in the transverse portion 156 of the upper valve housing 150. The slider cradle 186 is operable to be slid on the outer tube 182.

An exemplary embodiment of the lower valving assembly 20 is shown in detail in FIGS. 1-15c, and particularly in FIGS. 4, 5d, 6d, 7d, 10a-10b, and 11-15c. Exemplary components will be described. In the illustrated embodiment of FIGS. 1-15c, the lower valving assembly 20 includes a lower valve body 204, a diverter assembly 206, a handle assembly 208, various O-rings, and a set screw. The lower valve body 204 includes a lower valve housing 210 and a lower valve insert 212. The lower valve housing 210 includes a longitudinal portion 214 and a transverse portion 216.

The longitudinal portion 214 of the lower valve housing 210 includes a rear end portion 218 and a front end portion 220. The rear end portion 218 of the longitudinal portion 214 of the lower valve housing 210 includes a rear opening 222, an inner surface 224, and an outer surface 226. The inner surface 224 of the rear end portion 218 of the longitudinal portion 214 of the lower valve housing 210 is threaded. The outer surface 226 of the rear end portion 218 of the longitudinal portion 214 of the lower valve housing 210 is threaded. The front end portion 220 of the longitudinal portion 214 of the lower valve housing 210 includes a front opening 228. The longitudinal portion 214 of the lower valve housing 210 includes a longitudinal bore 230 extending between the rear opening 222 and the front opening 228. The longitudinal bore 230 in the longitudinal portion 214 of the lower valve housing 210 includes a shoulder 232.

The transverse portion 216 of the lower valve housing 210 includes a top end portion 234 and a bottom end portion 236. The transverse portion 216 of the lower valve housing 210 has a central longitudinal axis. The top end portion 234 of the transverse portion 216 of the lower valve housing 210 includes a top opening 238 and a top cavity 240 extending inwardly from the top opening 238. The bottom end portion 236 of the transverse portion 216 of the lower valve housing 210 includes a bottom opening 242, a bottom cavity 244 extending inwardly from the bottom opening 242, and an outer surface 246. The outer surface 246 of the bottom end portion 236 of the transverse portion 216 of the lower valve housing 210 is threaded. The top cavity 240 in the top end portion 234 of the transverse portion 216 of the lower valve housing 210 is operable to receive the lower valve insert 212. The lower valve insert 212 includes a tube passageway 248 and a flow passageway 250. The transverse portion 216 of the lower valve housing 210 includes a tube passageway 252, a flow passageway 254, an upper or first port 256, and a lower or second port 258. The first port 256 includes a central longitudinal axis. The second port 258 includes a central longitudinal axis. The central longitudinal axis of the first port 256 and the central longitudinal axis of the second port 258 are offset from the central longitudinal axis of the transverse portion 216 of the lower valve housing 210. The central longitudinal axis of the first port 256 and the central longitudinal axis of the second port 258 are aligned with each other, but could be offset from each other.

The tube passageway 248 in the lower valve insert 212 and the tube passageway 252 in the transverse portion 216 of the lower valve housing 210 are operable to receive the lower end portion 198 of the inner tube 184. The flow passageway 250 in the lower valve insert 212 is in fluid communication with the flow passageway 254 in the transverse portion 216 of the lower valve housing 210. The flow passageway 254 in the lower valve housing 210 is in fluid communication with the longitudinal bore 230 in the longitudinal portion 214 of the lower valve housing 210. The longitudinal bore 230 in the longitudinal portion 214 of the lower valve housing 210 is in fluid communication with the first port 256 and the second port 258 in the transverse portion 216 of the lower valve housing 210. The first port 256 in the transverse portion 216 of the lower valve housing 210 is in fluid communication with the inner tube 184. The second port 258 in the transverse portion 216 of the lower valve housing 210 is in fluid communication with the bottom cavity 244 in the bottom end portion 236 of the transverse portion 216 of the lower valve housing 210.

The diverter assembly 206 includes a diverter nut 260, a diverter spool 262, a diverter spring 264, and a diverter seal 266. The diverter nut 260 includes a rear end portion 268 and a front end portion 270. The rear end portion 268 of the diverter nut 260 includes four fingers 272 and a rear outer surface 274. The rear outer surface 274 of the rear end portion 268 of the diverter nut 260 is threaded. The front end portion 270 of the diverter nut 260 includes a shoulder 276. The diverter spool 262 includes a cavity 278, an outer surface 280, and a front end portion 282. The cavity 278 in the diverter spool 262 is operable to receive the diverter spring 264 and the diverter seal 266. The outer surface 280 of the diverter spool 262 includes two O-ring grooves 284, with one O-ring groove 284 located on each side of the cavity 278. The front end portion 282 of the diverter spool 262 includes a bore 286. The bore 286 in the front end portion 282 of the diverter spool 262 is threaded.

The diverter spool 262 (with the diverter spring 264 and the diverter seal 266 therein) is operable to be inserted through the rear opening 222 in the rear end portion 218 of the longitudinal portion 214 of the lower valve housing 210 and received in the longitudinal bore 230 in the longitudinal portion 214 of the lower valve housing 210. The diverter nut 260 is operable to be inserted through the rear opening 222 in the rear end portion 218 of the longitudinal portion 214 of the lower valve housing 210 and threaded into the rear end portion 218 of the longitudinal portion 214 of the lower valve housing 210 until the shoulder 276 on the front end portion 270 of the diverter nut 260 abuts the shoulder 232 in the longitudinal bore 230 in the longitudinal portion 214 of the lower valve housing 210. The diverter nut 260 is operable to secure the diverter spool 262 in the longitudinal bore 230 in the longitudinal portion 214 of the lower valve housing 210.

The handle assembly 208 includes a handle base 288, a handle cap 290, and a handle screw 292. The handle base 288 includes a rear end portion 294, a front end portion 296, and a handle bat 298. The rear end portion 294 of the handle base 288 is operable to be attached to the diverter spool 262 via the handle screw 292 and the threaded bore 286 in the front end portion 282 of the diverter spool 262. The handle cap 290 is operable to snap into the front end portion 296 of the handle base 288. The handle assembly 208 is operable to rotate the diverter spool 262 (with the diverter spring 264 and the diverter seal 266 therein) within the longitudinal bore 230 in the longitudinal portion 214 of the lower valve housing 210 and divert fluid flow from the flow passageway 254 in the transverse portion 216 of the lower valve housing 210 to the first port 256 and the second port 258 in the transverse portion 216 of the lower valve housing 210.

An exemplary embodiment of the showerhead assembly 22 is shown in detail in FIGS. 1-15c, and particularly in FIG. 1. Exemplary components will be described. In the illustrated embodiment of FIGS. 1-15c, the showerhead assembly 22 includes a shower arm 300 and a showerhead 302. The shower arm 300 includes a rear end portion 304 and a front end portion 306. The rear end portion 304 of the shower arm 300 includes a rear opening 308. The front end portion 306 of the shower arm 300 includes a front opening 310. The shower arm 300 is hollow between the rear opening 308 and the front opening 310, and is operable to have fluid flow therethrough. The shower arm 300 is operable to be threaded into the front end portion 160 of the longitudinal portion 154 of the upper valve housing 150. The shower arm 300 is in fluid communication with the inner tube 184 via a second passageway 312 in the upper valve housing 150. The front end portion 306 of the shower arm 300 is operable to be threaded into the showerhead 302. The showerhead 302 is in fluid communication with the shower arm 300.

An exemplary embodiment of the handshower assembly 24 is shown in detail in FIGS. 1-15c, and particularly in FIG. 1. Exemplary components will be described. In the illustrated embodiment of FIGS. 1-15c, the handshower assembly 24 includes an elbow assembly 314, a hose 316, and a handshower 318. The elbow assembly 314 includes a gasket seal 320, a washer 322, a check valve 324, an elbow insert 326, a lock ring 328, an elbow nut 330, an elbow housing 332, and various O-rings.

The elbow housing 332 includes a top end portion 334 and a bottom end portion 336. The top end portion 334 of the elbow housing 332 includes a top opening 338 and an inner surface 340. The inner surface 340 of the top end portion 334 of the elbow housing 332 includes a lock groove 342. The bottom end portion 336 of the elbow housing 332 includes a bottom opening 344 and an outer surface 346. The outer surface 346 of the bottom end portion 336 of the elbow housing 332 is threaded. The elbow housing 332 includes a passageway 348 extending between the top opening 338 and the bottom opening 344.

The elbow insert 326 includes a top end portion 350 and a bottom end portion 352. The top end portion 350 of the elbow insert 326 includes a top opening 354 and an outer surface 356. The outer surface 356 of the top end portion 350 of the elbow insert 326 includes a flange 358. The bottom end portion 352 of the elbow insert 326 includes a bottom opening 360 and an outer surface 362. The outer surface 362 of the bottom end portion 352 of the elbow insert 326 includes two O-ring grooves 364 and a lock groove 366. The elbow insert 326 includes a passageway 368 between the top opening 354 and the bottom opening 360.

The elbow nut 330 includes a top end portion 370, a bottom end portion 372, and a central opening 374. The top end portion 370 of the elbow nut 330 includes an inner surface 376. The inner surface 376 of the top end portion 370 of the elbow nut 330 is threaded. The bottom end portion 372 of the elbow nut 330 includes an inner surface 378. The inner surface 378 of the bottom end portion 372 of the elbow nut 330 includes a flange 380.

The lock ring 328 is operable to be inserted into the lock groove 366 in the bottom end portion 352 of the elbow insert 326. The elbow insert 326 (with the O-rings and the lock ring 328 thereon) is operable to be inserted through the central opening 374 in the elbow nut 330 until the flange 358 on the outer surface 356 of the top end portion 350 of the elbow insert 326 abuts the flange 380 on the inner surface 378 of the bottom end portion 372 of the elbow nut 330. The elbow insert 326 (with the O-rings and the lock ring 328 thereon) is operable to be inserted through the top opening 338 in the top end portion 334 of the elbow housing 332 and into the passageway 348 in the elbow housing 332 until the lock ring 328 snaps into the lock groove 342 in the inner surface 340 of the top end portion 334 of the elbow housing 332. The lock ring 328 is operable to retain the elbow insert 326 in the passageway 348 in the elbow housing 332. The check valve 324, the washer 322, and the gasket seal 320 are operable to be inserted into the top end portion 350 of the elbow insert 326. The elbow nut 330 is operable to be threaded onto the bottom end portion 236 of the transverse portion 216 of the lower valve housing 210. The elbow nut 330 is operable to connect the elbow housing 332 to the bottom end portion 236 of the transverse portion 216 of the lower valve housing 210.

The hose 316 includes an upstream end 382 and a downstream end 384. The upstream end 382 of the hose 316 includes a threaded connector. The upstream end 382 of the hose 316 is operable to be threaded onto the bottom end portion 336 of the elbow housing 332. The downstream end 384 of the hose 316 includes a threaded connector. The downstream end 384 of the hose 316 is operable to be threaded onto the handshower 318. The handshower 318 is operable to be received in the slider cradle 186.

During assembly of the illustrated embodiment of FIGS. 1-15c, components of the lower valving assembly 20 are preassembled. Exemplary assembly steps will be described. The O-rings are placed in the O-ring grooves 284 in the outer surface 280 of the diverter spool 262, and the diverter spring 264 and the diverter seal 266 are inserted into the cavity 278 in the diverter spool 262. The diverter spool 262 (with the O-rings thereon and the diverter spring 264 and the diverter seal 266 therein) is inserted through the rear opening 222 in the rear end portion 218 of the longitudinal portion 214 of the lower valve housing 210 and into the longitudinal bore 230 in the longitudinal portion 214 of the lower valve housing 210. The diverter nut 260 is inserted through the rear opening 222 in the rear end portion 218 of the longitudinal portion 214 of the lower valve housing 210 and threaded into the rear end portion 218 of the longitudinal portion 214 of the lower valve housing 210. The rear end portion 294 of the handle base 288 is placed on the front end portion 220 of the longitudinal portion 214 of the lower valve housing 210 and secured to the diverter spool 262 via the handle screw 292 and the threaded bore 286 in the front end portion 282 of the diverter spool 262. The handle cap 290 is snapped into the front end portion 296 of the handle base 288.

During assembly of the illustrated embodiment of FIGS. 1-15c, components of the handshower assembly 24 are preassembled. Exemplary assembly steps will be described. The O-rings are placed in the O-ring grooves 364 in the outer surface 362 of the bottom end portion 352 of the elbow insert 326, and the lock ring 328 is placed in the lock groove 366 in the outer surface 362 of the bottom end portion 352 of the elbow insert 326. The elbow insert 326 (with the O-rings and the lock ring 328 thereon) is inserted from the top end portion 370 of the elbow nut 330 into the central opening 374 in the elbow nut 330 until the flange 358 on the outer surface 356 of the top end portion 350 of the elbow insert 326 abuts the flange 380 on the inner surface 378 of the bottom end portion 372 of the elbow nut 330. The elbow insert 326 (with the O-rings and the lock ring 328 thereon) is inserted through the top opening 338 in the top end portion 334 of the elbow housing 332 into the passageway 348 in the elbow housing 332 until the lock ring 328 snaps into the lock groove 342 in the inner surface 340 of the top end portion 334 of the elbow housing 332. The check valve 324, the washer 322, and the gasket seal 320 are inserted through the top opening 354 in the top end portion 350 of the elbow insert 326 and into the passageway 368 in the elbow insert 326. The top end portion 370 of the elbow nut 330 is threaded onto the bottom end portion 236 of the transverse portion 216 of the lower valve housing 210.

During assembly of the illustrated embodiment of FIGS. 1-15c, components of the lower mounting assembly 14 are preassembled. Exemplary assembly steps will be described. The intermediate portion 104 of the swivel member 94 is threaded through the inner rim 120 of the lower mounting member 96 until the threaded front outer surface 112 of the intermediate portion 104 of the swivel member 94 no longer engages the threaded inner surface 134 of the inner rim 120 of the lower mounting member 96 and the non-threaded rear outer surface 110 of the intermediate portion 104 of the swivel member 94 extends through the inner rim 120 of the lower mounting member 96.

During assembly of the illustrated embodiment of FIGS. 1-15c, components of the upper valving assembly 16, the slide bar assembly 18, the lower valving assembly 20, and the lower mounting assembly 14 are preassembled. Exemplary assembly steps will be described. The upper valve insert 152 is secured in the upper end portion 188 of the outer tube 182 via brazing. The lower valve insert 212 is secured in the lower end portion 190 of the outer tube 182 via brazing. The inner tube 184 is inserted into the tube passageway 176 in the upper valve insert 152, the outer tube 182, and the tube passageway 248 in the lower valve insert 212. The slider cradle 186 is placed over the outer tube 182. The bottom end portion 168 of the transverse portion 156 of the upper valve housing 150 is placed over the upper valve insert 152 such that the upper valve insert 152 is received in the transverse bore 172 in the transverse portion 156 of the upper valve housing 150 and the upper end portion 196 of the inner tube 184 is received in the tube passageway 174 in the transverse portion 156 of the upper valve housing 150. The top end portion 234 of the transverse portion 216 of the lower valve housing 210 is placed over the lower valve insert 212 such that the lower valve insert 212 is received in the top cavity 240 in the top end portion 234 of the transverse portion 216 of the lower valve housing 210 and the lower end portion 198 of the inner tube 184 is received in the tube passageway 252 in the transverse portion 216 of the lower valve housing 210. The front portion 106 of the swivel member 94 is threaded into the rear end portion 218 of the longitudinal portion 214 of the lower valve housing 210.

During installation of the illustrated embodiment of FIGS. 1-15c, components of the upper mounting assembly 12 are installed. Exemplary installation steps will be described. The rear end portion 34 of the inner shank 26 is threaded into an elbow of the water supply behind the mounting surface. The upper mounting member 30 is placed over the inner shank 26 with the inner shank 26 extending through the central opening 80 in the upper mounting member 30. The upper mounting member 30 is attached to the mounting surface via screws through the mounting holes 82 in the back plate 74 of the upper mounting member 30. The rear end portion 52 of the outer shank 28 is placed over the front end portion 36 of the inner shank 26. The rear end portion 52 of the outer shank 28 is threaded into the inner rim 78 of the upper mounting member 30 until the shoulder 62 on the rear end portion 52 of the outer shank 28 abuts the inner rim 78 of the upper mounting member 30. As the rear end portion 52 of the outer shank 28 is threaded into the inner rim 78 of the upper mounting member 30, the fingers 58 on the rear end portion 52 of the outer shank 28 deform (e.g., plastically) inside the tapered rear inner surface 88 of the inner rim 78 of the upper mounting member 30. The threaded rear outer surface 60 of the rear end portion 52 of the outer shank 28 and the threaded front inner surface 90 of the inner rim 78 of the upper mounting member 30 engage prior to the fingers 58 on the rear end portion 52 of the outer shank 28 deforming. Once the fingers 58 on the rear end portion 52 of the outer shank 28 have deformed, the shoulder 46 on the front end portion 36 of the inner shank 26 can engage the fingers 58 on the rear end portion 52 of the outer shank 28, and in particular the inwardly projecting bumps 64 on the free ends of the fingers 58, and prevent the inner shank 26 from moving out of the outer shank 28.

During installation of the illustrated embodiment of FIGS. 1-15c, the preassembled components of the upper valving assembly 16, the slide bar assembly 18, the lower valving assembly 20, and the lower mounting assembly 14 are installed. Exemplary installation steps will be described. The rear end portion 158 of the longitudinal portion 154 of the upper valve housing 150 is placed over the outer shank 28 such that the preassembled components are in position relative to the mounting surface. The preassembled components are leveled both vertically and horizontally. Markings are made on the mounting surface through the mounting holes 124 in the back plate 116 of the lower mounting member 96. The rear end portion 158 of the longitudinal portion 154 of the upper valve housing 150 is removed from the outer shank 28 such that the preassembled components are no longer in position relative to the mounting surface. The front portion 106 of the swivel member 94 is threaded out of the rear end portion 218 of the longitudinal portion 214 of the lower valve housing 210. The swivel member 94 is still connected to the lower mounting member 96 with the non-threaded rear outer surface 110 of the intermediate portion 104 of the swivel member 94 extending through the inner rim 120 of the lower mounting member 96.

The lower mounting member 96 (with the swivel member 94 connected thereto) is attached to the mounting surface via screws through the mounting holes 124 in the back plate 116 of the lower mounting member 96. The upper escutcheon 32 is placed on the rear end portion 158 of the longitudinal portion 154 of the upper valve housing 150. The lower escutcheon 100 is placed on the rear end portion 218 of the longitudinal portion 214 of the lower valve housing 210. The securing member 98 is threaded onto the rear end portion 218 of the longitudinal portion 214 of the lower valve housing 210. The rear end portion 158 of the longitudinal portion 154 of the upper valve housing 150 is again placed over the outer shank 28 such that the preassembled components are in position relative to the mounting surface. The rear opening 222 in the rear end portion 218 of the longitudinal portion 214 of the lower valve housing 210 is aligned with the front portion 106 of the swivel member 94. The front portion 106 of the swivel member 94 is threaded into the rear end portion 218 of the longitudinal portion 214 of the lower valve housing 210 pulling the lower valve housing 210 toward the mounting surface. The securing member 98 is threaded toward the mounting surface until the at least a portion of the spherical rear surface 142 of the rear portion 136 of the securing member 98 abuts the spherical front surface 132 of the inner rim 120 of the lower mounting member 96. The upper valve housing 150 is secured relative to the outer shank 28 via a set screw. Because the swivel member 94 is free to rotate within the lower mounting member 96, the slide bar assembly 18 can be mounted in a vertical orientation even when the mounting surface is off from vertical.

Although the abutting surfaces of the lower mounting assembly 14 (i.e., the front surface 108 of the rear portion 102 of the swivel member 94, the rear surface 130 of the inner rim 120 of the lower mounting member 96, the front surface 132 of the inner rim 120 of the lower mounting member 96, and the rear surface 142 of the rear portion 136 of the securing member 98) have been described as being spherical, one of ordinary skill in the art will appreciate that these abutting surfaces may not be spherical. For example, these abutting surfaces may be other shapes, such as conical, so long as the shape of the abutting surfaces allows the surfaces to rotate relative to each other. The shape of these abutting surfaces may be described as angled. One of ordinary skill in the art will appreciate that angled surfaces include curved angle surfaces.

During operation of the illustrated embodiment of FIGS. 1-15c, water flows from a water supply behind the shower wall through the components of the showering system 10 as follows: (1) through the passageway 50 in the inner shank 26, (2) through the passageway 72 in the outer shank 28, (3) through the longitudinal bore 166 in the longitudinal portion 154 of the upper valve housing 150, (4) through the first passageway 180 in the upper valve housing 150, (5) through the flow passageway 178 in the upper valve insert 152, (6) through the outer tube 182, (7) through the flow passageway 250 in the lower valve insert 212, (8) through the flow passageway 254 in the lower valve housing 210, and (9) into the longitudinal bore 230 in the longitudinal portion 214 of the lower valve housing 210.

If the showerhead 302 is selected by rotating the handle assembly 208 to a first position (which rotates the diverter assembly 206 to a corresponding first position), the water then flows through the components of the showering system 10 as follows: (1) through the first port 256, (2) through the inner tube 184, (3) through the second passageway 312 in the upper valve housing 150, (4) through the shower arm 300, and (5) through the showerhead 302. In the first position, the diverter assembly 206 allows full flow of water through the first port 256.

If the handshower 318 is selected by rotating the handle assembly 208 to a second position (which rotates the diverter assembly 206 to a corresponding second position), the water then flows through the components of the showering system 10 as follows: (1) through the second port 258, (2) through the bottom cavity 242 in the bottom end portion 236 of the transverse portion 216 of the lower valve housing 210, (3) through the check valve 324, (4) through the passageway 368 in the elbow insert 326, (5) through the passageway 348 in the elbow housing 332, (6) through the hose 316, and (7) through the handshower 318. In the second position, the diverter assembly 206 allows full flow of water through the second port 258.

Because the central longitudinal axis of the first port 256 and the central longitudinal axis of the second port 258 are offset from the central longitudinal axis of the transverse portion 216 of the lower valve housing 210, rotation of the handle assembly 208 (and thus the diverter assembly 206) from the first position to the second position requires less than one-hundred eighty degrees of rotation. In the illustrated embodiment, rotation of the handle assembly 208 (and thus the diverter assembly 206) from the first position to the second position only requires ninety degrees of rotation. When the handle assembly 208 is rotated to a position in the middle of the first position and the second position (which rotates the diverter assembly 206 to a corresponding middle position), the water then flows through both the first port 256 and the second port 258 and through both the showerhead 302 and the handshower 318. However, in the middle position, the flow through the first port 256 and the second port 258 is at a significantly reduced flow rate.

While the showering system 10 has been shown and described in the illustrated embodiment as including certain components, one of ordinary skill in the art will appreciate that the showering system 10 does not need to include each of these components.

For example, the upper valving assembly 16 and the lower valving assembly 20 have been described as including the upper valve body 148 and the lower valve body 204, respectively. Additionally, the upper valve body 148 has been described as including the upper valve housing 150 and the upper valve insert 152, and the lower valve body 204 has been described as including the lower valve housing 210 and the lower valve insert 212. However, one of ordinary skill in the art will appreciate that the upper valve insert 152 could be integrally formed with the upper valve housing 150, and the lower valve insert 212 could be integrally formed with the lower valve housing 210. Alternatively, one of ordinary skill in the art will appreciate that the upper valve insert 152 and the lower valve insert 212 could be integrally formed with the outer tube 182.

While the showering system 10 has been shown and described in the illustrated embodiment with the components attached or engaged in a particular manner, one of ordinary skill in the art will appreciate that the components of the showering system 10 do not need to be attached or engaged in this particular manner.

One of ordinary skill in the art will now appreciate that the present invention provides a plumbing fixture fitting with a mounting system. Although the present invention has been shown and described with reference to a particular embodiment, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. A plumbing fixture fitting with mounting system, comprising:
    a swivel member, the swivel member including a rear portion and a front portion, the rear portion including a front surface, the front portion including a threaded outer surface; and
    a mounting member, the mounting member including a back plate, an inner rim, and an opening, the back plate including a mounting hole, the inner rim including a rear surface;
    wherein the opening in the mounting member is operable to receive the swivel member;
    wherein the front surface of the rear portion of the swivel member is operable to rotatably abut the rear surface of the inner rim of the mounting member; and
    wherein the threaded outer surface of the front portion of the swivel member is operable to be threaded into a valve body.

2. The plumbing fixture fitting with mounting system of claim 1, wherein the swivel member includes an intermediate portion.

3. The plumbing fixture fitting with mounting system of claim 2, wherein the intermediate portion of the swivel member includes a threaded front outer surface.

4. The plumbing fixture fitting with mounting system of claim 2, wherein the intermediate portion of the swivel member includes a non-threaded rear outer surface.

5. The plumbing fixture fitting with mounting system of claim 1, wherein the mounting member includes an outer rim.

6. The plumbing fixture fitting with mounting system of claim 1, further including a valve body.

7. The plumbing fixture fitting with mounting system of claim 6, wherein:
    the valve body includes a longitudinal portion, the longitudinal portion includes a rear end portion, the rear end portion includes a threaded inner surface and a threaded outer surface; and
    the threaded outer surface of the front portion of the swivel member is operable to be threaded into the threaded inner surface of the rear end portion of the longitudinal portion of the valve body.

8. A plumbing fixture fitting with mounting system, comprising:
    a swivel member, the swivel member including a rear portion, an intermediate portion, and a front portion, the rear portion including a front surface, the intermediate portion including a non-threaded rear outer surface and a threaded front outer surface, the front portion including a threaded outer surface;
    a mounting member, the mounting member including a back plate, an inner rim, and an opening, the back plate including a mounting hole, the inner rim including a rear surface, a front surface, and a threaded inner surface; and
    a securing member, the securing member including a rear portion, a front portion, and an opening, the rear portion including a rear surface, the front portion including a threaded inner surface;
    wherein the threaded front outer surface of the intermediate portion of the swivel member is operable to be threaded through the threaded inner surface of the inner rim of the mounting member until the threaded front outer surface of the intermediate portion of the swivel member no longer engages the threaded inner surface of the inner rim of the mounting member;
    wherein the front surface of the rear portion of the swivel member is operable to rotatably abut the rear surface of the inner rim of the mounting member;

wherein the front surface of the inner rim of the mounting member is operable to rotatably abut the rear surface of the rear portion of the securing member;

wherein the threaded outer surface of the front portion of the swivel member is operable to be threaded into a valve body; and wherein the threaded inner surface of the front portion of the securing member is operable to be threaded onto the valve body.

9. The plumbing fixture fitting with mounting system of claim 8, wherein the mounting member includes an outer rim.

10. The plumbing fixture fitting with mounting system of claim 8, further including a valve body.

11. The plumbing fixture fitting with mounting system of claim 10, wherein:

the valve body includes a longitudinal portion, the longitudinal portion includes a rear end portion, the rear end portion includes a threaded inner surface and a threaded outer surface;

the threaded outer surface of the front portion of the swivel member is operable to be threaded into the threaded inner surface of the rear end portion of the longitudinal portion of the valve body; and the threaded inner surface of the front portion of the securing member is operable to be threaded onto the threaded outer surface of the rear end portion of the longitudinal portion of the valve body.

12. A plumbing fixture fitting with mounting system, comprising:

an inner shank, the inner shank including a rear end portion and a front end portion, the rear end portion including a rear opening and a threaded rear outer surface, the front end portion including a front opening, the inner shank including a passageway between the rear opening and the front opening;

an outer shank, the outer shank including a rear end portion and a front end portion, the rear end portion including a rear opening, a plurality of fingers, and a threaded rear outer surface, the front end portion including a front opening, the outer shank including a passageway between the rear opening and the front opening; and a mounting member, the mounting member including a back plate, an inner rim, and an opening, the back plate including a mounting hole, the inner rim including a tapered rear inner surface and a threaded front inner surface;

wherein the threaded rear outer surface of the rear end portion of the inner shank is operable to be threaded into a water supply pipe;

wherein the opening in the mounting member is operable to receive the inner shank;

wherein the passageway in the outer shank is operable to receive the front end portion of the inner shank;

wherein the inner rim of the mounting member is operable to receive the rear end portion of the outer shank;

wherein the threaded rear outer surface of the rear end portion of the outer shank is operable to be threaded into the threaded front inner surface of the inner rim of the mounting member;

wherein the fingers on the rear end portion of the outer shank are operable to deform inside the tapered rear inner surface of the inner rim of the mounting member as the threaded rear outer surface of the rear end portion of the outer shank is threaded into the threaded front inner surface of the inner rim of the mounting member; and wherein the front end portion of the outer shank is operable to be received in a valve body.

13. The plumbing fixture fitting with mounting system of claim 12, wherein the front end portion of the inner shank includes a front outer surface, and the front outer surface includes a groove.

14. The plumbing fixture fitting with mounting system of claim 12, wherein each finger of the rear end portion of the outer shank includes an inwardly projecting bump.

15. The plumbing fixture fitting with mounting system of claim 14, wherein the front end portion of the inner shank includes a shoulder that can contact the inwardly projecting bumps on the fingers of the rear end portion of the outer shank.

16. The plumbing fixture fitting with mounting system of claim 15, wherein the rear end portion of the outer shank includes a shoulder that can contact the inner rim of the mounting member.

17. The plumbing fixture fitting with mounting system of claim 12, wherein the rear end portion of the outer shank includes four fingers.

18. The plumbing fixture fitting with mounting system of claim 12, wherein the mounting member includes an outer rim.

19. The plumbing fixture fitting with mounting system of claim 12, further including a valve body.

20. The plumbing fixture fitting with mounting system of claim 19, wherein the valve body includes a longitudinal portion, the longitudinal portion includes a longitudinal bore, and the longitudinal bore is operable to receive the front end portion of the outer shank.

* * * * *